Dec. 29, 1925.

E. E. KLEINSCHMIDT 1,567,392

TELEGRAPH TYPEWRITER

Filed July 5, 1923     12 Sheets-Sheet 1

Inventor
Edward E. Kleinschmidt
By William A. Strauch
Attorney

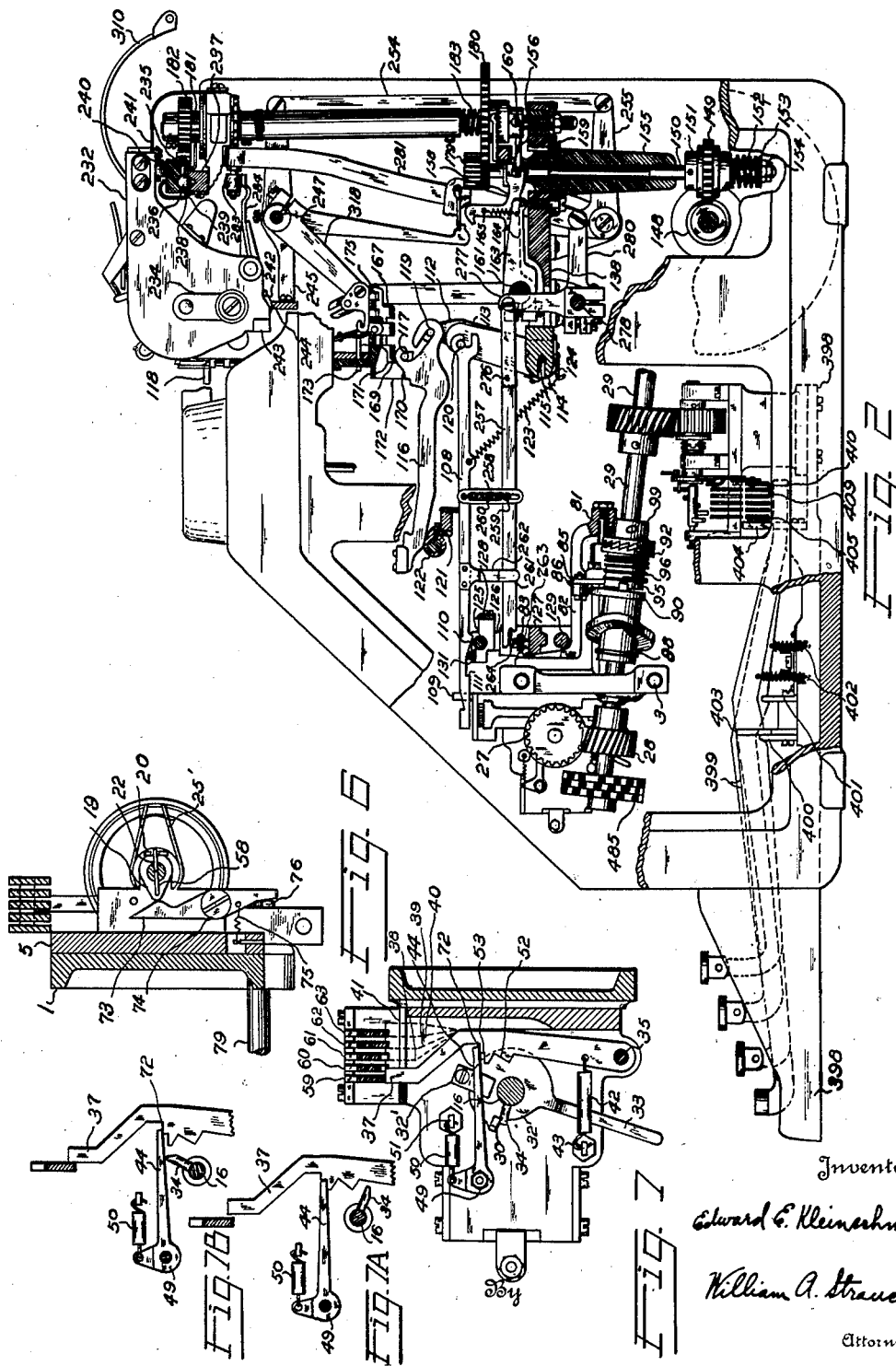

Dec. 29, 1925.
E. E. KLEINSCHMIDT
1,567,392
TELEGRAPH TYPEWRITER
Filed July 5, 1923     12 Sheets-Sheet 3
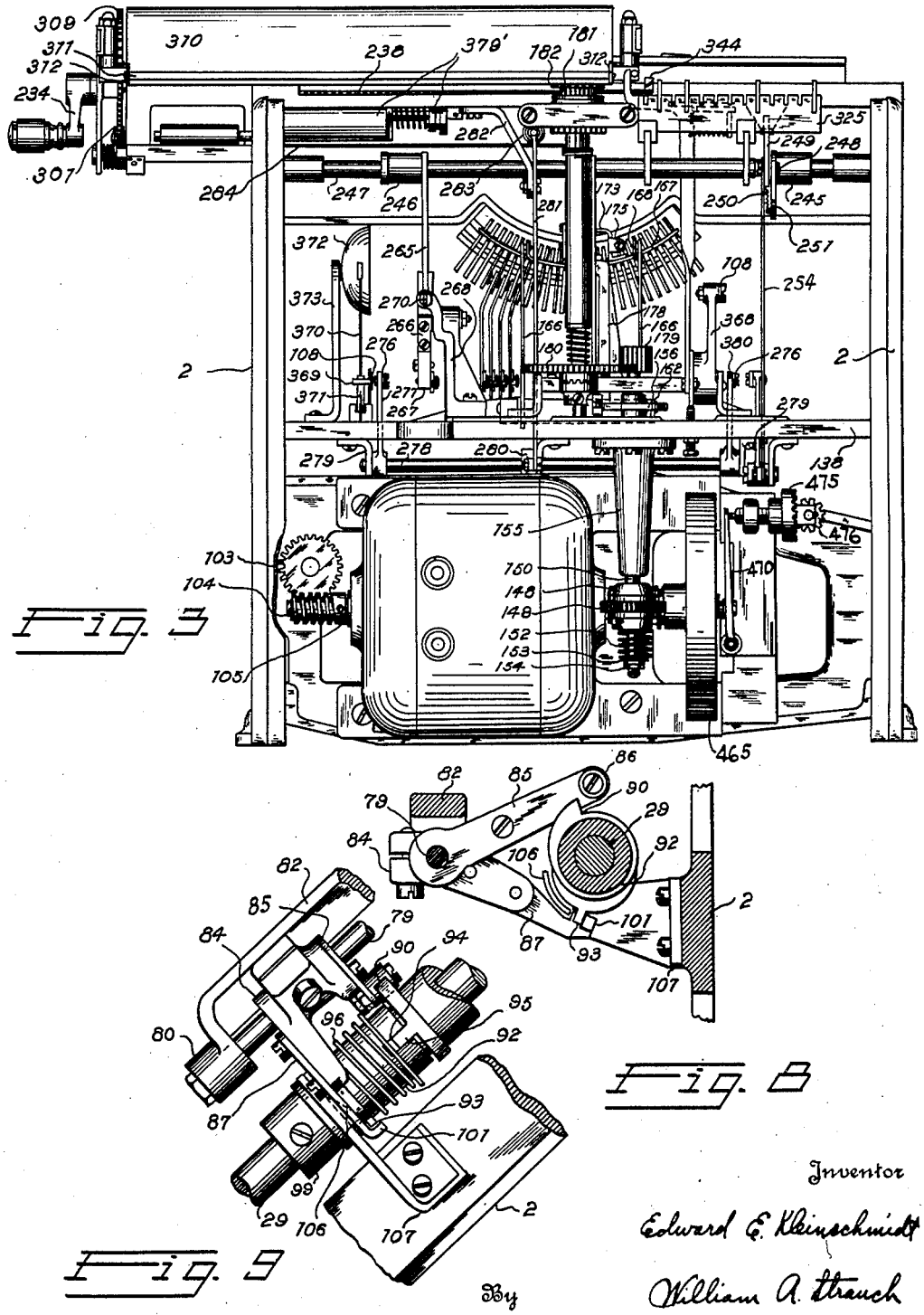
Inventor
Edward E. Kleinschmidt
William A. Strauch
By
Attorney Dec. 29, 1925.　　　　　　　　　　1,567,392
E. E. KLEINSCHMIDT
TELEGRAPH TYPEWRITER
Filed July 5, 1923　　　12 Sheets-Sheet 4
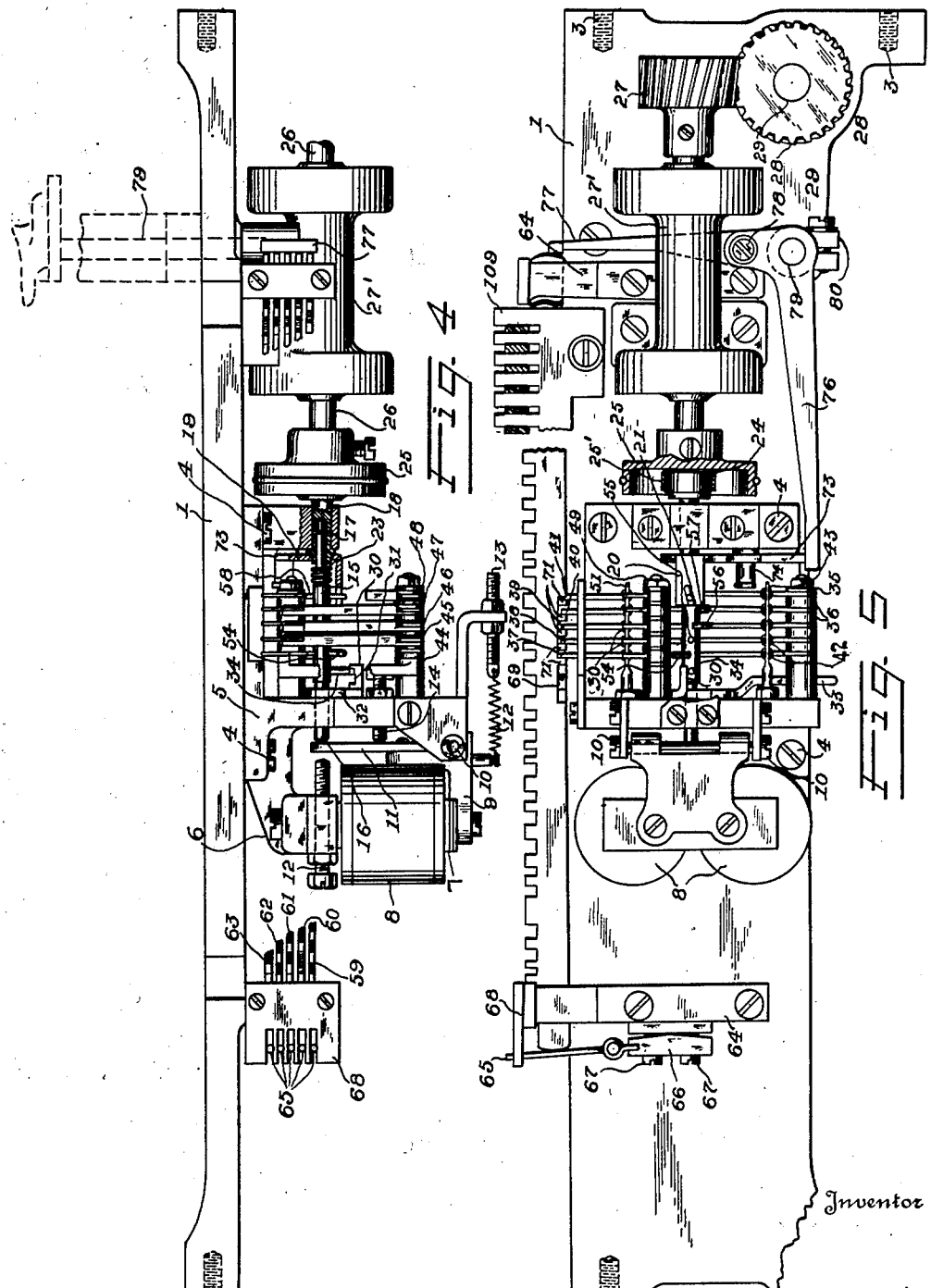
Inventor
Edward E. Kleinschmidt
By William A. Strauch
Attorney Dec. 29, 1925.  
E. E. KLEINSCHMIDT  
TELEGRAPH TYPEWRITER  
Filed July 5, 1923  
1,567,392  
12 Sheets-Sheet 5
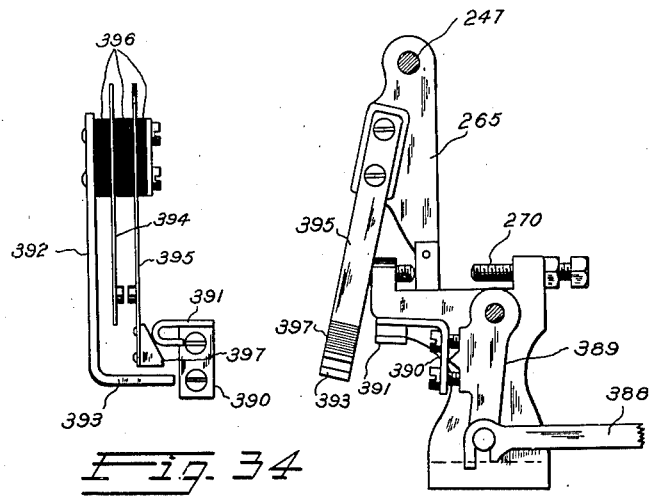
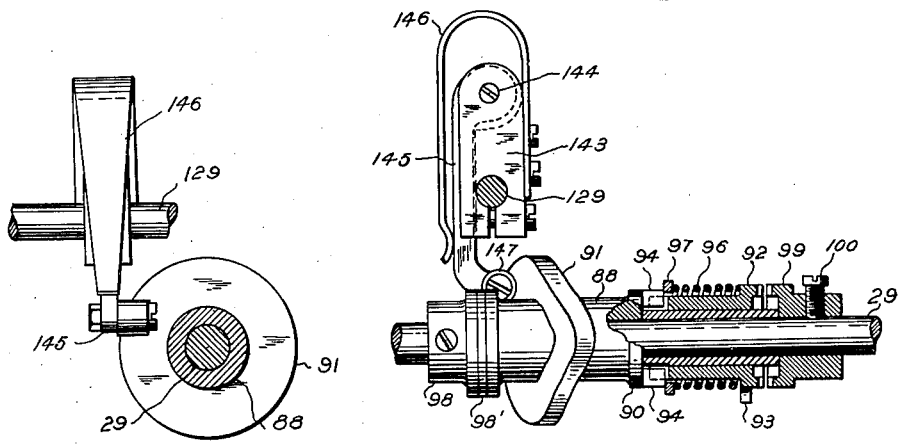
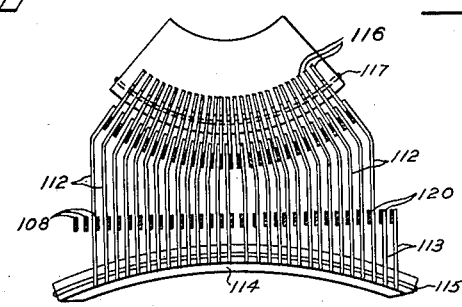
Inventor  
Edward E. Kleinschmidt  
William A. Strauch  
By  
Attorney Dec. 29, 1925.  
E. E. KLEINSCHMIDT  
1,567,392  
TELEGRAPH TYPEWRITER  
Filed July 5, 1923     12 Sheets-Sheet 6
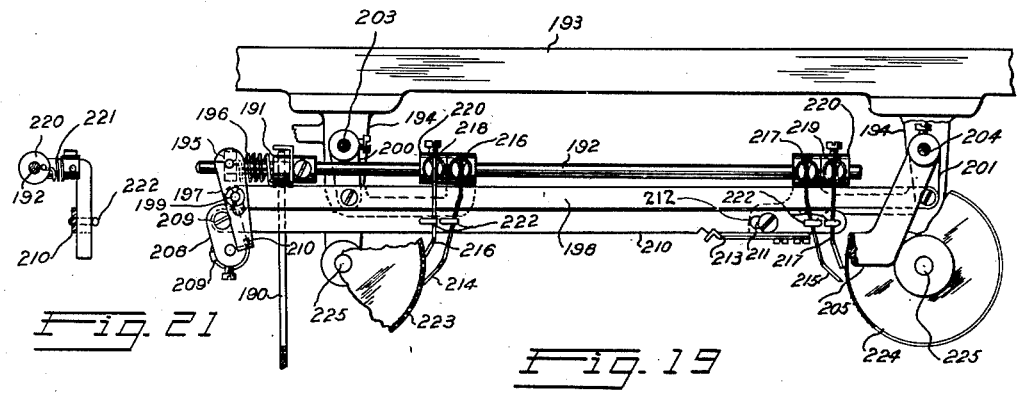
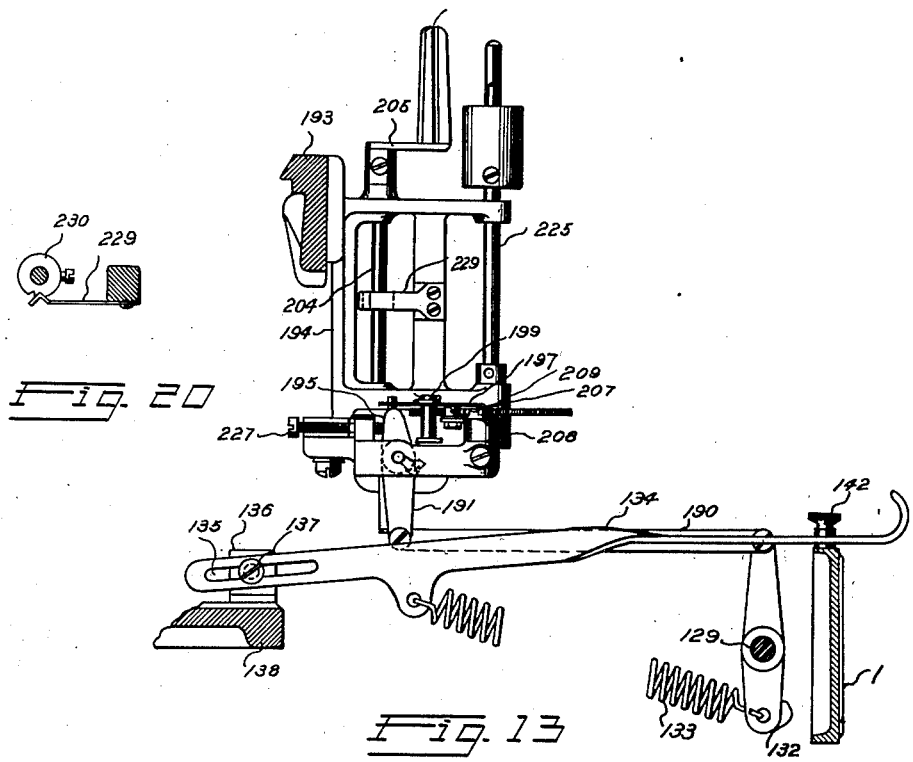
Inventor  
Edward E. Kleinschmidt  
By William A. Strauch  
Attorney Dec. 29, 1925.  1,567,392
E. E. KLEINSCHMIDT
TELEGRAPH TYPEWRITER
Filed July 5, 1923    12 Sheets-Sheet 7
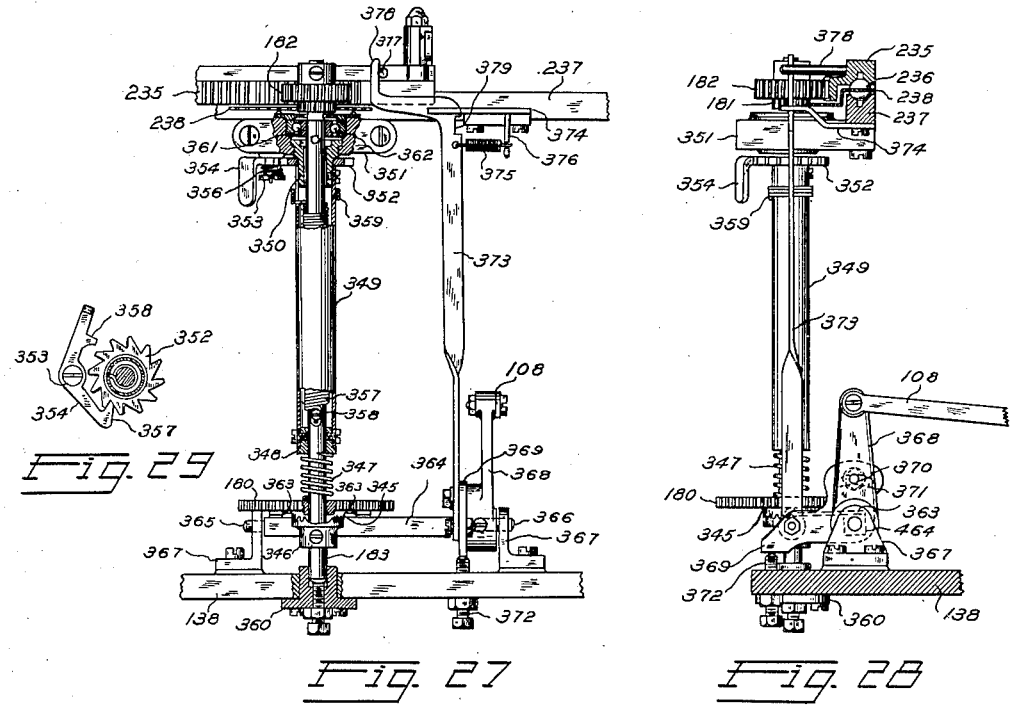
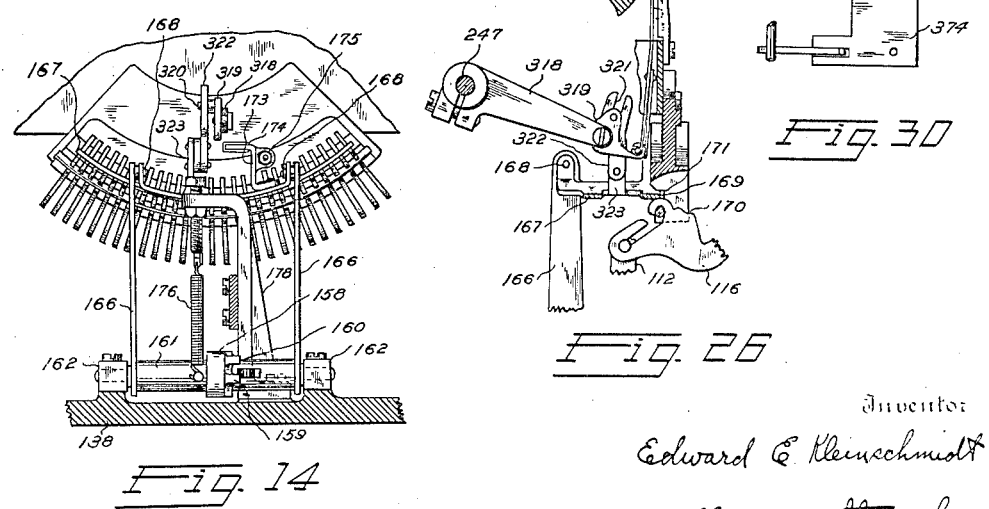
Inventor
Edward E. Kleinschmidt
William A. Strauch
By
Attorney Dec. 29, 1925.  
E. E. KLEINSCHMIDT  
1,567,392  
TELEGRAPH TYPEWRITER  
Filed July 5, 1923 12 Sheets-Sheet 8

INVENTOR.  
Edward E. Kleinschmidt  
BY  
William A. Strauch  
ATTORNEY.

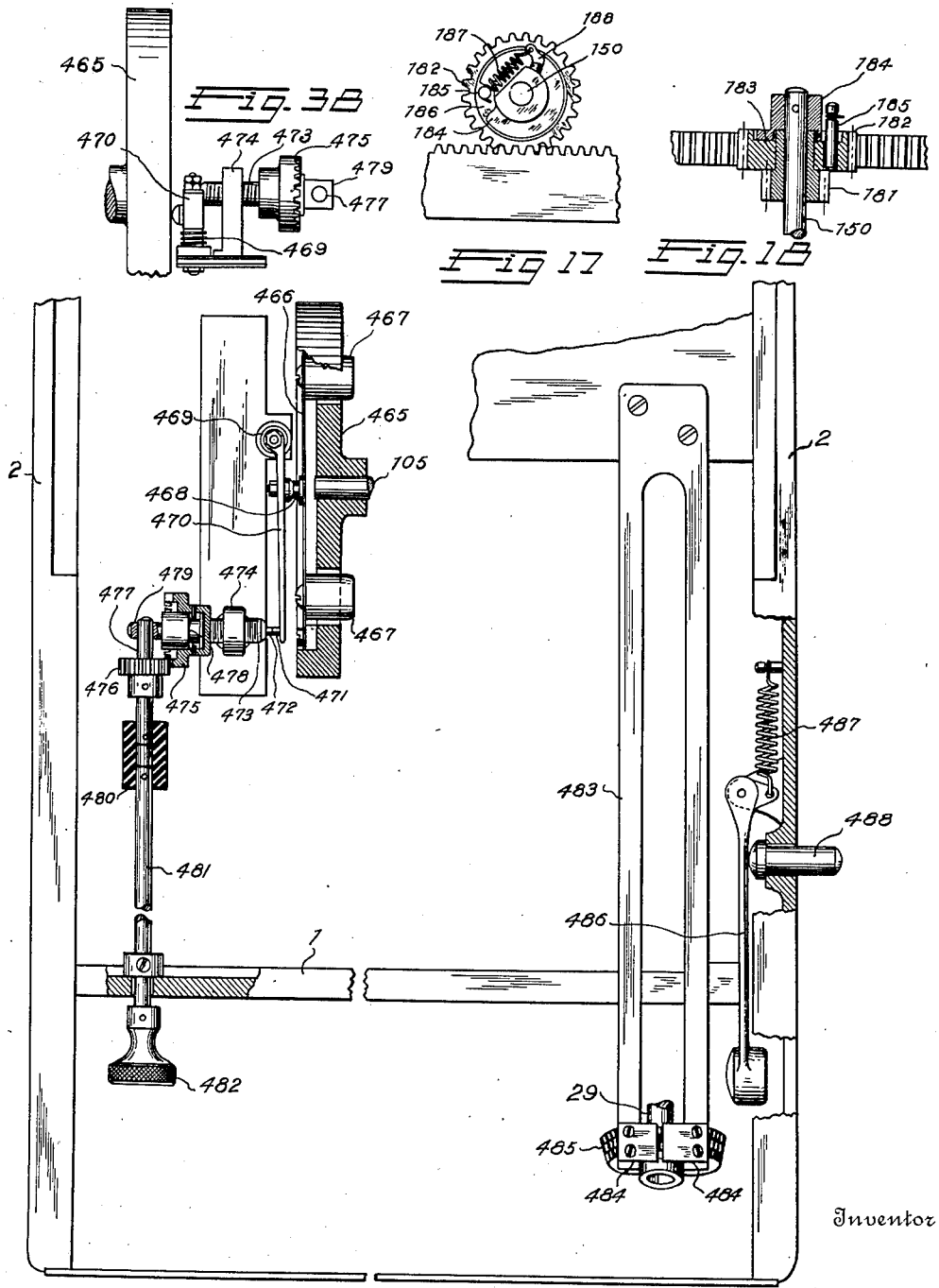

Dec. 29, 1925.

E. E. KLEINSCHMIDT

TELEGRAPH TYPEWRITER

Filed July 5, 1923

Inventor
Edward E. Kleinschmidt
By William A. Strauch
Attorney

Dec. 29, 1925.

E. E. KLEINSCHMIDT 1,567,392

TELEGRAPH TYPEWRITER

Filed July 5, 1923      12 Sheets-Sheet 11

Inventor
Edward E. Kleinschmidt
By William A. Strauch
Attorney

Dec. 29, 1925.
E. E. KLEINSCHMIDT
1,567,392
TELEGRAPH TYPEWRITER
Filed July 5, 1923    12 Sheets-Sheet 12
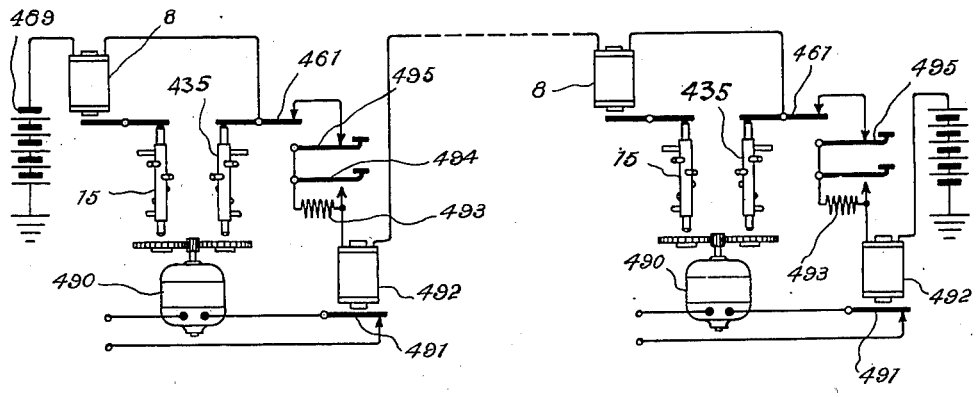
Fig. 39
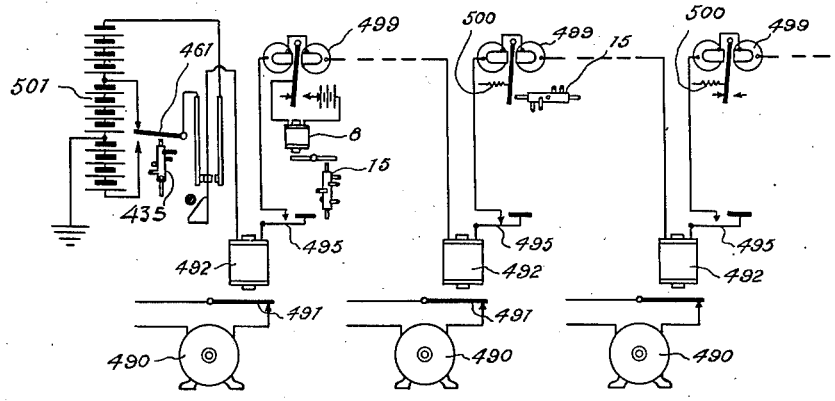
Fig. 40
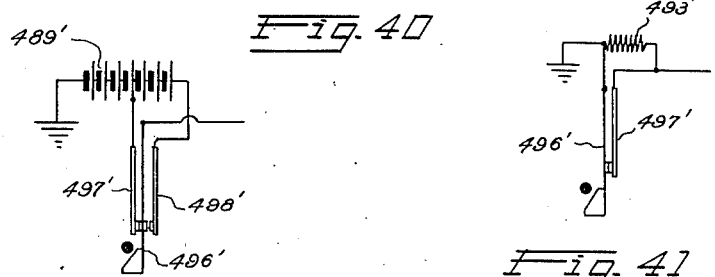
Fig. 42
Fig. 41
INVENTOR
Edward E. Kleinschmidt
BY William A. Strauch
ATTORNEY Patented Dec. 29, 1925.

1,567,392

UNITED STATES PATENT OFFICE.

EDWARD E. KLEINSCHMIDT, OF BROOKLYN, NEW YORK, ASSIGNOR, BY MESNE ASSIGNMENTS, TO MORKRUM-KLEINSCHMIDT CORPORATION, OF CHICAGO, ILLINOIS, A CORPORATION OF DELAWARE.

TELEGRAPH TYPEWRITER.

Application filed July 5, 1923. Serial No. 649,562.

*To all whom it may concern:*

Be it known that EDWARD E. KLEINSCHMIDT, a citizen of the United States, residing at Brooklyn, in the county of Kings and State of New York, has invented certain new and useful Improvements in Telegraph Typewriters, of which the following is a specification.

My invention relates to an improved printing telegraph system and apparatus therefor. Heretofore printing telegraph apparatus has been in general, complicated in structure, noisy in operation, difficult to adjust and to maintain in operation, and has been subject to excessive wear and rapid deterioration.

An object of the present invention is to provide a permutation code printing system in which the usual complicated synchronizing mechanism, and independent rotary distributing switches are eliminated.

Another object of the invention is the provision of a motor control system in which all the printer motors on the circuit are started into operation on the commencement of any transmission on the line, and in which the motors may be stopped from any station by the transmission of a special signal.

A further object of the invention is to provide a printer operable interchangeably with a continuously operating tape transmitter or with a keyboard transmitter started into operation at the beginning of each character signal, and stopped at the end of each character signal period.

Still another object of the invention is to provide a novel combination of a keyboard single contact transmitter and a single magnet printing unit combining in a single structure, the entire station apparatus, and in which the transmitter may be removed at any time and replaced during operation without affecting the operation of the printing unit.

The primary objects of the invention are to provide an entirely and radically new printing telegraph receiving unit; with a simplified and improved structure throughout, substantially noiseless in operation; conveniently and rapidly adjustable; in which the number and weight of parts is reduced to a minimum; in which all the operations are timed to utilize the entire interval available in order to reduce speed, shock and stresses of operation of the individual elements and at the same time attaining maximum speed and efficient operation of the printer as a whole; to provide a new governing and speed regulating arrangement; and to attain such objects and advantages as will appear in the following detailed description.

It will be understood that the numerous detailed improvements which have been effected involve many dependent features which have not been specifically enumerated in the statement of the objects of invention, and the scope of the invention involves all of these dependent and detailed features.

Although the preferred embodiment herein disclosed shows a single magnet cam actuated page printer in which the usual distributors have been eliminated, it will be apparent that the various detailed improvements and subcombinations disclosed are useful in other types of machines such as tape printers, multiple magnet printers and in many other selective mechanisms besides printing telegraphs.

Referring to the drawings, Fig. 1 is a plan view with parts broken away, and partially in section.

Fig. 2 is a side elevation, partially in section, with parts broken away.

Fig. 3 is a rear elevation.

Fig. 4 is a plan view of the receiving selecting mechanism.

Fig. 5 is a front elevation of the selecting mechanism.

Fig. 6 is a section taken along line A—A of Fig. 4.

Fig. 7 is a sectional view taken along line B—B of Fig. 5.

Figs. 7A and 7B are detailed views showing the selector overlap operation.

Fig. 8 is a fragmental sectional view taken along line C—C of Fig. 1, showing the printer bar clutch trip and selector bar restoring mechanism.

Fig. 9 is a fragmental projection of the details shown in Fig. 8 taken at an angle to show the clutch control mechanism.

Fig. 10 is a fragmental sectional view taken along line D—D of Fig. 1 showing the printer bail operating cam.

Fig. 11 is a fragmental side elevation, partially in section, showing the printer operating cam and clutch mechanism.

Fig. 12 is a fragmental sectional view, partially in diagram, showing the pivotal points for the type actions.

Fig. 13 is a fragmental sectional view taken along line E—E of Fig. 1 showing the printer bail spring and details of the ribbon feed.

Fig. 14 is a fragmental view showing the spacing pawl operating mechanism.

Figs. 17 and 18 show a modified form of drive connection for spacing.

Fig. 19 is a fragmental sectional view taken along line F F of Fig. 13 and showing ribbon feed details.

Fig. 20 is a fragmental sectional view taken on line G G of Fig. 13.

Fig. 21 is a fragmental sectional view taken on line H H of Fig. 19.

Fig. 26 is a fragmental sectional view showing the ribbon shift mechanism.

Fig. 27 is a fragmental sectional view showing a rear elevation of the spacing mechanism.

Fig. 28 is a side elevation of the mechanism shown in Fig. 27.

Fig. 29 is a detail view of the carriage return spring tension ratchet.

Fig. 30 is a detail of the carriage return latch.

Fig. 33 is a fragmental sectional view showing the details of an electrical contact control.

Fig. 34 is a fragmental side view of the contact mechanism shown in Fig. 33.

Fig. 37 is a fragmental plan view showing the speed regulating and control means.

Fig. 38 is a fragmental rear view showing the motor governor contact control.

Figs. 39 to 42 show forms of transmission and motor control circuits.

Figure 1:
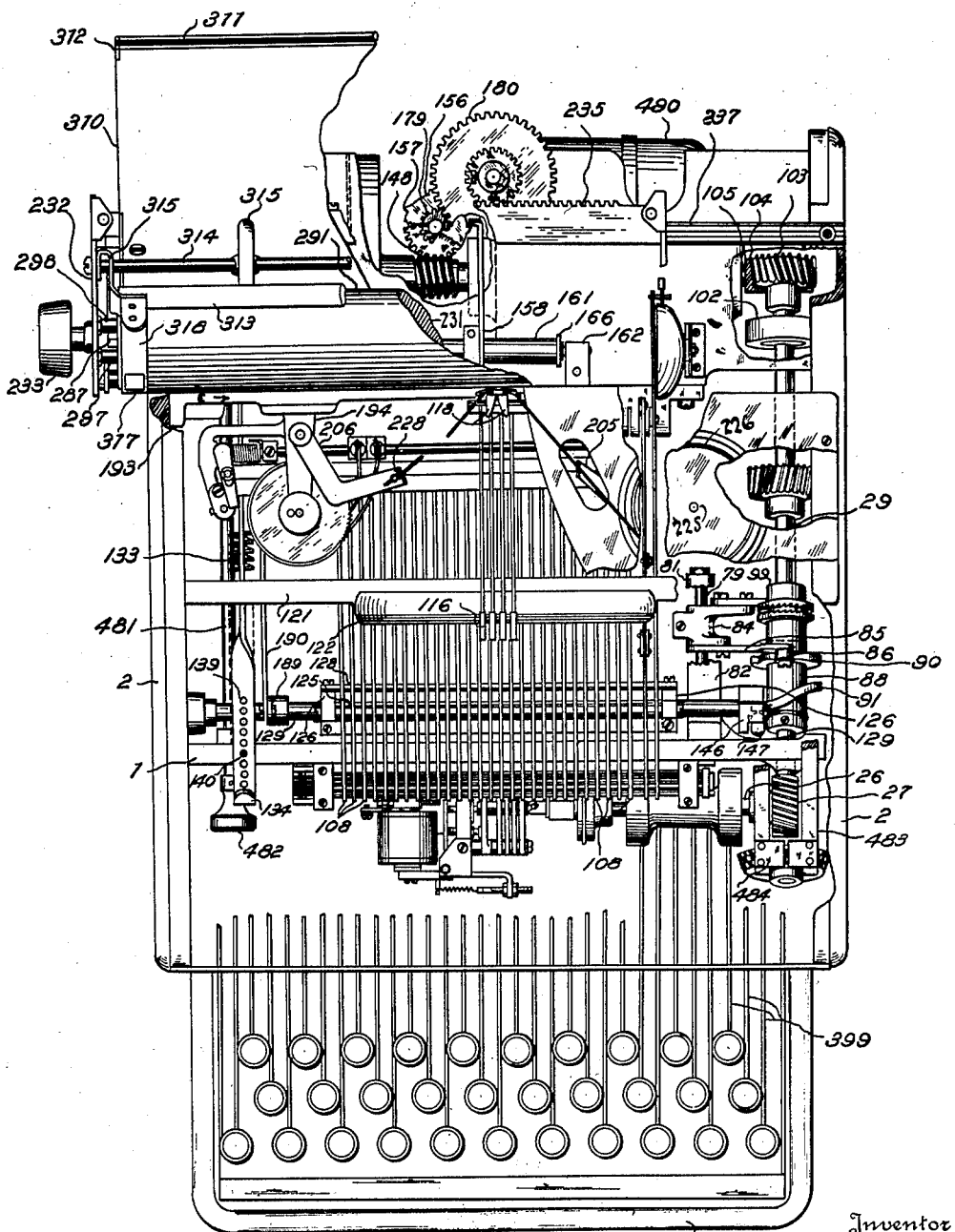

In the preferred embodiment herein described, the usual five unit code is utilized to effect the selective operations of the receiver. Concordance of operation of the receivers and transmitter is maintained by starting the receiver into operation at the beginning of each character signal by the transmission of a start condition, the receiver being arrested at the end of each signal. When keyboard transmission is used, the transmitter is also started into operation at the beginning of each signal, the transmitter and receiver being operated at substantially equal speeds. When tape transmission is used, the transmitter is driven continuously at a slightly slower rate of speed than the receiver, and the receiver is operated in the same manner as for keyboard operation. In order to adapt the receiver for use interchangeably with keyboard or tape transmission, a special construction of keyboard is adopted. The construction of the keyboard transmitter is made dependent on the construction of the receiving selector unit and is therefore especially useful in such a relation only. The tape transmitter is arranged to transmit in any manner, permutations of signalling conditions, each signal period being divided into seven equal time intervals comprising a start interval, five code combination intervals, and a stop interval to insure the receiver coming to rest at the end of each signal period. The result is a continuous transmission of uniform marking and spacing conditions to the receiver.

Since the receiver operates at a faster rate than the tape transmitter, and is started and stopped once during each revolution, a special provision is made in the receiver to compensate for the stopping time and speed difference of the receiver. This compensation is made in the receiving selector, which has been so arranged that all the functions of the usual Baudot receiving distributor synchronizing devices and the multiple receiving Baudot relays and selecting magnets are performed by a single line magnet and a rotary cam shaft.

*Selector mechanism.*

The selector mechanism is mounted on a base 1 (Figs. 1 to 6) which is secured to the side plates 2 (Figs. 1 and 2) by means of studs or cap screws fastened in tapped holes 3, or in any other convenient manner. Base 1 will then act as a front tie and supporting frame member to carry the mechanism. Secured to base 1 (Fig. 5) by means of screws 4 is a selector supporting structure 5. Seated on an extension 6 of structure 5, and secured thereto by screws or in any suitable manner, is a selector magnet core 7 upon which are wound coils 8. An armature 9 for the selector magnet is pivoted at 10 and rigidly secured to armature 9 is an armature extension 11. An adjustable back stop screw 12 is provided in extension 6 for limiting the movement of armature 9. A spring 12 with an adjusting screw 13 is provided to give armature 9 with extension 11, a normal bias against stop 12 when coils 8 are de-energized. An adjustable stop screw 14 is provided to limit the motion of extension 11 when coils 8 are energized. A cam shaft 15 (Fig. 4) at one end has a reduced extension 16, rotatably and slidably journaled in support 5, and at the other end has a reduced extension 17 rotatably and slidably journaled in a shaft 18. Shaft 18 has rigidly secured thereto and rotatable therewith, a cam member 19 and projecting therefrom is a shelf 20 in which is cut a slot 21 (Fig. 5). A cam 22 (Fig. 6) set into cam shaft 15 acts as a drive connection between shafts 15 and 18. A spring 23 (Fig. 4) interposed between 19 and the end shoulder of 15 forces shaft 15 and extension 16 to the left in Fig. 4 against armature extension 11. Slot 21 is cut at an angle in shelf 20 so that, as 18 is rotated a slight end thrust will be exerted to assist spring 23 in moving the pin barrel to the left in Fig. 4. Shaft 18 is secured to a member 24 (Fig. 5) of a friction clutch. Member 24 is constantly in frictional engagement with springs 25' (Figs. 5 and 6) fastened to a clutch member 25 which in turn is secured to a shaft 26. Shaft 26 is supported from base 1 by means of thrust 27', and is driven continuously while the printer is operating by means of helical gears 27 and 28 from shaft 29. Provision is made in bearing 27' to take up the thrust due to the fact that shafts 26 and 29 operate at right angles to each other. It will be understood that this drive may be effected with bevel gears if so desired.

A stop member 30 (Figs. 4, 5 and 7) provided with a notch 31 (Fig. 4) is carried by an orienting member 32 which is rotatably mounted on extension 16 and frictionally held against 5 by a clamping member 32' (Fig. 7) in a manner to permit its adjustment about shaft extension 16 as a center. An orienting arm 33 is provided for adjusting the relative position of stop member 31 which is frictionally held in the position where set during operation. A stop pin 34 fastened in shaft 15 is normally held against stop member 30 as shown in Fig. 4 when magnet armature 9 is attracted and shaft 15 is in zero position.

Pivoted to support 5 on extension 35 and spaced apart by members 36 are five selector bar control fingers 37 to 41. The relative positions of fingers 38 to 41 has been indicated by dot and dash lines in Fig. 7. A spring 42 individual to each control finger supported from member 43 (Figs. 5 and 7) tends to force the control fingers to the left in Fig. 7. Coacting with and individual to the control fingers 37 to 41 respectively are five control finger latches 44 to 48 spaced apart as shown in Fig. 4 and pivotally supported from 5 by extension member 49. Latches 44 to 48 normally tend to move toward shaft 15 under the influence of springs 50 individual to each of said latches. Springs 50 are attached to supporting member 51. Latch 44 is offset for a purpose that will hereinafter appear. Each of the control fingers 37 to 41 is provided with a cam surface 52 (Fig. 7) and a locking shoulder 53. Shoulders 53 coact with latches 44 to 48 to hold fingers 37 to 41 in actuated position.

Five control finger actuating cams 54 to 58 are secured to shaft 15 in a manner to coact with cam surfaces 52 on fingers 37 to 41 respectively in timed relation with the reception of incoming impulses by the selector magnet. As above pointed out, for tape transmission, each character signalling period is divided into seven equal intervals during which a start condition, five signal conditions and a stop condition are transmitted. Each interval at the transmitter therefore corresponds to about 51¾ degrees of a revolution of a tape transmitter sending a character per revolution. The receiver cam shaft, however, rotates at a faster rate, than the transmitter in a manner to cover an angular distance of about 55 degrees for each of the first six intervals and for the seventh or stop interval it rotates 30 degrees, coming to rest before the seventh or stop signal has been completely received. In this manner the time in which the receiver cam shaft is rotating through the stop interval plus the time in which it is stopped at the end of each signal period is just equal to the time period of one signal interval. Accordingly cam 54 is so located as to rotate past the cam surface 52 on finger 37 at substantially the central portion of the second signal interval, the first signal interval being the start period. With the position of 54 fixed in this manner, the remaining cams 55 to 58 are spaced at angular distances of 55 degrees around the cam shaft. Cams 54 to 58 are axially spaced along the shaft so that when the selector magnet is energized, the cams 54 to 58 will be in line with fingers 37 to 41 and when the selector magnet is de-energized they will pass between the fingers 37 to 41 as the cam shaft rotates. For reasons that will appear hereinafter, stop pin 34 and cam 55 are placed in line as shown in Fig. 5. It will be apparent that when the selector magnet is de-energized with the cam shaft at rest, the cam shaft will move to the left in Fig. 4, permitting pin 34 to pass through notch 31, and the cam shaft will then be rotated by the operation of shaft 26 and the friction clutch. As the various cams 54 to 58 rotate past their respective cams 52, the fingers 37 to 41 respectively will be operated or unaffected, depending on whether the selector magnet is energized or de-energized. When any of the fingers 37 to 41 are actuated by the respective cams 54 to 58 being brought into alignment with cams 52 at the proper time, the corresponding ones of the latches 44 to 48 ride over shoulders 53 on the actuated fingers and lock these fingers in actuated position. It will be noted that latches 44 to 48 are wide enough to be actuated by the pin 34, and cams 55 to 58 respectively in either position of the cam shaft, and accordingly as the cam shaft rotates, these latches are actuated to release the set selector bar control fingers, and restore the latches, permitting restoration of the actuated ones of the fingers 37 to 41. Latches 45 to 48 are restored successively and by the same cams which set fingers 38 to 41 respectively. Because of the alignment of pin 34 and cam 55, stop pin 34 restores latch 44 simultaneously with the restoration of latch 45 by pin 55. Owing to the offset in latch 44, cam 54 does not operate any of the latches. The angular relation of latches 44 to 48 and control fingers 54 to 58 is such that latches 44 and 45 are restored during the start interval of the signal period, and finger 37 is therefore restored to unactuated position just in time to be reset in event that a marking condition is received and the selector magnet is energized during the second interval. Finger 38 is restored simultaneously with finger 37, during the first or start interval; finger 39 is restored during the second interval in which 37 is actuated, finger 40 is restored during the third interval and finger 41 is restored during the fourth interval in which finger 39 is actuated, during the fifth and sixth intervals fingers 40 and 41 are actuated, and during the seventh interval, the entire selection is stored on the control fingers and transferred in a manner hereinafter described, to the selector bars. After this transfer to the selector bars, another selection may be immediately set up on the control fingers.

It will be apparent that an overlap is provided in the selector control fingers whereby a new selection is partially set up before the preceding selection is cleared out, and the work of restoration is spread out over a greater portion of the signal period. The amount of power necessary to restore the selector is considerably lessened and permits a substantial reduction in size and mass of parts, in the size of the clutch, and in the shock and wear on the parts due to restoration. The selector mechanism so far described, performs all the functions of the heretofore common independent rotary switching distributor, selecting magnets, and overlap mechanism.

Figure 32:
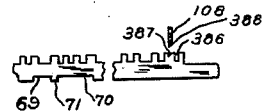
Fig. 32 is a detail of the selector bar construction.

Five notched selector bars 59 to 63 are mounted in brackets 64 secured to base plate 1, in a manner to permit longitudinal sliding movement thereof. Bars 59 to 63 are under the influence of five springs 65 mounted on a block 66 in a manner to be simultaneously adjustable in tension by means of screws 67. Springs 65 are held in position against the respective selector bars 59 to 63 by means of a guide plate 68, and normally tend to force the respective bars to the right in Figs. 4 and 5. Each of the selector bars 59 to 63 has cut in its lower edge two notches 69 and 70 in a manner to form a lug 71. (See Figs. 5 and 32). As shown in Figs. 4 to 7, the selector bars and the lugs 71 thereon are so arranged with respect to control fingers 37 to 41 that control finger 37 engages lug 71 on bar 59 to hold this bar to the left in Figs. 4 and 5, against the tension of its respective spring 65; and in like manner, fingers 38 to 41 respectively engage the remaining lugs 71 to hold bars 60 to 62 to the left in Figs. 4 and 5. It will be understood that the notches 69 and 70, and therefore the lugs 71 are relatively displaced on each selector bar to accommodate the spacing of control fingers 37 to 41. The notches are provided to permit a free and relatively wide movement of each finger 37 to 41 under the influence of pins 54 to 58 respectively, without interference by the relatively closely spaced selector bars. The relatively wide movement of these fingers is essential in providing for an overlap so that a selection may remain set up on the selector bars while a succeeding selection is set up on the fingers 37 to 41. This overlap arrangement is an important feature of the present invention because of the simplicity, and is attained in the following manner.

Lugs 71 on the selector bars are made of sufficient width, so that, when the selected ones of bars 59 to 63 have been released by fingers 37 to 41 and are moved to actuated position shown in Figs. 7ᴬ by springs 65 as will be hereinafter described, and the latches 44 to 48 are actuated to release the set ones of fingers 37 to 41, these actuated or set fingers will abut against the lugs 71 as shown in Fig. 7ᴮ of the respective actuated selector bars, and will restore only partially. Shoulders 53 on fingers 37 to 41 are so placed, however, that this partial restoration is sufficient to move the shoulders 53 past the lower edges of latches 44 to 48 and the latches will abut against surfaces 72 (Fig. 7ᴮ) of the fingers 37 to 41. At this stage, the respective latches 44 to 48 are therefore fully restored, while the respective fingers 37 to 41 are only partially restored. Now, if any partially restored finger is to enter into the succeeding selective combination, it will be reset by the pin of 54 to 58 and the latch of 44 to 48 individual thereto; and the latch will again engage shoulder 53. The latches of the partially restored fingers which do not enter into the succeeding selective combination will remain in engagement with surfaces 72, and accordingly, when the selector bars 59 to 63 are moved to the left in Figs. 4 and 5, as will be hereinafter explained, to take up the succeeding selection, these fingers will completely restore and lock the unselected bars to the left in Figs. 4 and 5.

After the sixth signal interval has been completed and the selection has been completely set on fingers 37 to 41, cam member 19 (Fig. 6) actuates a control member 73. Control member 73 is pivoted at 74 to an extension of supporting structure 5 and is held against cam 19 by the action of a spring 75. During the first six intervals of a signal period, control member 73 is maintained in a position to act as a stop against which a bell crank lever 76 is held. Bell crank 76 is secured to selector bar restoring and control member 77 by means of a screw 78 or in any convenient manner, to form a rigid unitary structure. Members 76 and 77 are secured to and rotatable with spindle 79 by means of a split clamping arrangement 80 on member 77. When any of the selector bars 59 to 63 are released by actuation of the respective fingers 37 to 41 as above described, springs 65 force the released bars to the right against member 77. Until after the sixth signal interval, stop 73 holds member 77 and the released bars from moving under the influence of springs 65. During the seventh signal interval, cam 19 trips control member 73 and permits members 76 and 77 to rotate clockwise as viewed in Figure 5 under the stress exerted by springs 65 of the selected bars 59 to 63, the end of 76 being moved to the position shown in Fig. 6 with relation to member 73. In this manner during the seventh interval, the selector bars take the selected positions as determined by the positions of the fingers 37 to 41, and restoration of the actuated fingers is immediately thereafter commenced in the first or start interval of the succeeding signal period. As will appear hereinafter, the movement of spindle 79 trips a clutch mechanism shown in Figs. 8 and 9 which starts into operation, the printing mechanism. The printing of a character is then effected while the succeeding combination is being set up on the selector control fingers 37 to 41 and while the selection for the operation being carried out by the printing mechanism is being cleared off the fingers 37 to 41. After the selective operation has been completed by the printing mechanism, a cam action restores the selector bars gradually by rock spindle 79 to move member 77 and thereby restores selector bars 59 to 63 to the left in Fig. 5, and places them in position just in time to take up the succeeding selection from fingers 37 to 41. If it is desired to operate the selecting magnet by reverse current impulses instead of make and break impulses the polarized magnet as shown in Fig. 40 may be used to operate the cam shaft.

*Clutch details and selector bar restoration.*

Referring to Figs. 1, 2 and 4, spindle 79 extends through and is journaled in selector base plate 1, and at the other is journaled in a bearing 81 supported by a bracket 82 suitably secured by screws 83 (Fig. 2) to the rear of selector base plate 1. Rigidly secured to spindle 79 and rotatable therewith is a rocker arm 84 (Figs. 8 and 9). Secured to one side of rocker arm 84 is a selector bar restoring extension 85, carrying a roller 86. Secured to the other side of rocker 84 is a clutch release and clutch stop extension 87. Loosely mounted on shaft 29 is a sleeve member 88 with an integral extension 89 (Fig. 11). Formed integrally with sleeve 88 is a selector bar restoring cam 90 and a printer operating cam 91. Slidably mounted on sleeve extension 89 is a serrated or toothed clutch member 92 (Figs. 11 and 2) provided with a disengaging and stop projection 93 (Fig. 8, 9 and 11). Two notches 94 are cut into clutch member 92 (Figs. 9 and 11), and projecting teeth 95 integral with sleeve 88 are fitted into notches 94 in a manner to permit an axial sliding movement of 92 on 89, but at the same time effecting a driving connection between sleeve 88 and clutch member 92, so that when 92 is rotated it will drive 88 together with cams 90 and 91. A coil spring 96 is placed around clutch member 92 and rests at one end against a shoulder on 92 and at the other end on a washer or disc 97. A friction collar 98 (Fig. 11) is fastened by a set screw to shaft 29 and prevents movement of sleeve 88 to the left in Fig. 1. Interposed between 98 and 88 is a friction drive disc 98' against which the end surface of 88 is pressed. A toothed clutch member 99 is secured to shaft 29 by a set screw 100 (Figs. 1, 2 and 11). With the printer mechanism at rest in zero position as shown in the drawings, stop 93 is held against stop member 87 by spring 96, in a manner to maintain clutch members 92 and 99 disengaged, and at the same time is held against shoulder 101 (Figs. 8 and 9) of member 87 in a manner to prevent rotation of sleeve 88 with shaft 29. The pressure exerted by spring 96 on sleeve 88 through disc 97 forces sleeve 88 against collar 98 causes sufficient friction between the continuously rotating collar 98 and sleeve 88, to insure stop 93 being brought positively to a position of rest against shoulder 101 without the necessity of providing a lock to bring sleeve 88 to a zero position. Shaft 29 is supported from and journaled in selector base 1, at one end and from side frame 2 by means of bearing 102 (Fig. 1) at the other end. Secured to the end of shaft 29 is a worm wheel 103 (Fig. 1) through which shaft 29 is driven continuously from a worm gear 104 mounted on motor shaft 105.

Shafts 29 and 15 are fixed in such relation and so timed, that cam 90 comes to the position shown in Fig. 8 just before, or as cam 19 (Fig. 6) actuates member 73 to permit members 76 and 77 to be actuated by the movement of the selected ones of the selector bars. As the bars move to selected position, members 85 and 87 are moved downwardly in Fig. 8 by the rocking movement imparted to spindle 79. The downward movement of 87, releases clutch member 92 for axial movement and rotation. Clutch member 92 is then forced into engagement with clutch member 99, and sleeve 88 together with cams 90 and 91 are rotated with shaft 29. As before pointed out, cam 19 functions in the seventh signal interval after a selection has been completely set up on the selector control fingers 37 to 41, and the reception of the succeeding signal then immediately proceeds. Cam 90 operates on roller 86 (Fig. 8) to raise rocker 34 just before the seventh interval of the succeeding selective combination and positions stop member 87 so that 93 will again engage member 87 and shelf 91 to bring sleeve 88 to rest in zero position. As sleeve 88 approaches zero position, stop projection 93 rides up on a cam surface 106 (Figs. 8 and 9) supported from side frame 2 by a bracket 107. As shown in Fig. 8 this cam surface is so shaped as to force stop projection 93 into its disengaged zero position against 87 and 101. As spindle 79 is rotated in a counterclockwise direction in Figs. 5 and 8 by rocker 84, member 76 is moved to permit control member 73 to rotate under the influence of spring 75 (Fig. 6), and the selector bars are restored to the left in Fig. 5 by member 77. This mechanism is then locked by members 73 and 76, just in time to be released for the succeeding selection which in the meantime has been completely set up on control fingers 37 to 41. The shape of cam 17 is such as to cause restoration of the selector bars to commence towards the end of its complete revolution. In this manner the time for effecting the operations to be performed in response to the selective set up of the selector bars is materially increased, and the operations of the printing mechanism may be accordingly reduced in speed. Substantially a full signal period may be utilized in this manner for effecting a printing stroke and a return stroke of a selected type bar. This is an important feature of the invention.

*Type action.*

As is well understood, the various combinations of selector bar positions bring into alignment differing series of selector bar notches. A series of actuating bars 108 (Figs. 1 and 2) extending through guide plate 109 (Figs. 2 and 5) are arranged to co-act with selector bars 59 to 63 to effect the selected operation. Each bar 108 is provided with a cam projection 110 (Fig. 2) and a shoulder 111. Certain of these actuating bars are pivotally connected to type bar actuating arms 112 (Figs. 2 and 12) while others may be connected to pivoted arms 113, the latter actuating bars being utilized, as will hereinafter appear, to operate printer mechanisms other than the type actions. In order to provide a type bar action in which printing of the various characters is effected by a uniform distance of movement of the bars 108 individual to the respective type bars, arms 112 and 113 are pivoted on a support 114 (Figs. 2 and 12) shaped in the segment of a circle, by means of a curved pin 115. Type bars 116 are of similar structure except for the angle at which the type are applied, and are pivoted on a segment of a circle by means of pin 117 (Figs. 2 and 12) in a manner to cause the type to strike the platen properly between type guides 118, when the respective bars 116 are actuated. Each arm 112 is connected with its respective type bar 116 by means of a pin 119 fastered to each arm 112 and adapted to slide in slots in the type bars as shown in Fig. 2. Actuating bars 108 are connected to arms 112 and 113 by means of pins 120, the axes of pins 120 being in a straight line. With the radius of pivot pin 117 fixed by the structure of the machine and length of type bars, to cause proper striking of the type, and the connection of bars 108 to arms 112 and 113 fixed in a straight line, the radius of pivot pin 115 is so chosen as to cause equal movements of the type bars for equal movements of actuating bars. This results in the arc of the pivot points for 112 and 113 being reversed in curvature from the arc of the pivot points of the type bars. It will be apparent that movement of an actuating bar 108 to the left in Fig. 2 will cause the connected arm 112 to swing forward causing pin 119 to swing type bar 116 into engagement with the platen. An arc shaped support 121 (Figs. 1 and 2) provided with a cushion 122 acts as a stop against which the type bars rest in unactuated position. Springs 123 (Fig. 2) one fastened to each actuating bar 108 and to clips 124 secured to support 114, are provided to return the type and actuating bars to rest or unactuated position as shown in Fig. 2.

*Printer mechanism operating bail.*

Cam projections 110 of actuating bars 108 are held by springs 123 against a universal bar 125 (Figs. 1 and 2) supported in members 126. Members 126 are joined by cross pieces 127 and 128 (Fig. 2) to form a printer bail frame work. This frame work is rigidly secured to and rotatable with a shaft 129 which is supported in bearings 130 from side frames 2. Secured to members 126 is a universal operating bar 131. Extending downward from shaft 129 and rigidly secured thereto is an arm 132 (Fig. 13) to which is fastened printing or bail operating spring 133 (Figs. 1 and 13) the other end of which is fastened to a tension adjusting member 134. Member 134 is provided with a slot 135 and is slidably secured to a support 136 by a pin 137. Support 136 is mounted on a rear cross piece 138 (Figs. 2 and 13) of the printer frame work. A series of holes 139 (Fig. 1) are provided in member 134 arranged to register with a pin 140 (Fig. 1). Pin 140 is threaded to take a clamping thumb screw cap 142. By changing the registration of pin 140 and holes 139, the tension of spring 133 may conveniently be varied while the printer is operating, to vary the strength of the printing blow. This adjustable printing spring arrangement is an important feature of the invention and permits varying of the printing pressure at will, to provide for manifolding of copies, and to serve other useful purposes. It will be apparent that the tension of spring 133 forces the operating bail frame, together with the universal bars 131 and 125 forward or to the left in Fig. 2. In order to control the movement of the operating bail frame and to store the necessary operating energy in spring 133, an actuating member 143 (Figs. 1, 11 and 12) is rigidly secured to shaft 129 by clamping screws or in any convenient manner. Pivotally secured to 143 at 144 is a cam actuated member 145. A spring 146 is arranged to exert pressure on 145 and transmits the stress exerted on shaft 129 by spring 133 to member 145. A roller 147 mounted on 145 is held against cam 91 by the action of springs 133 and 146.

As pointed out above, after the selector fingers 37 to 41 have been set according to the received combination, sleeve 88 is started into rotation and at the same time, bars 59 to 63 are moved to their selected positions. As soon as bars 59 to 63 are set to align the selected slots, cam 91 acts on roller 147 to permit forward movement (to the left in Fig. 2) of the operating bail frame under influence of spring 133. As the bail frame moves forward, all of the actuating bars 108 are permitted to drop (see Fig. 2) with cam projections 110 held in engagement with bar 125 by the action of springs 123. Since only one set of slots has been aligned by the setting of the selector bars, all of the bars 108 except the selected one above the aligned selector bar stops will be brought to rest by striking the selector bar projections, before they have dropped far enough to permit engagement of shoulders 111 with operating bar 131. The bar 108 over the aligned selector bar slots will, however, continue to drop until it has entered into the slots when the continued movement of the operating bail frame will cause 131 to engage shoulder 111 and will move this actuating bar forward. The forward movement of the selected bar 108 will then cause a printing stroke of the connected actuating bar, or the performance of a control operation as the case may be. After the operating stroke of the selected actuating bar has been completed cam 91 is so shaped that the movement of the operating bail is reversed. The weight of the type bar and the action of spring 123 causes the selected type bar to complete the return of the actuating bar to the right in Figure 2, and the restoration of the type bar to rest before the selected actuating bar 108 has been removed from the aligned slots. After the type bar has been completely restored, bar 108 engages projection 110 of the selected bar and lifts it clear of the aligned slots, and finally the cams 110 on the unselected bars are engaged to restore these bars to rest position. As the selected bar 108 is cleared of the aligned slots, cam 90 become operative to restore the selector bars 59 to 63 for the next selection and to bring sleeve 88 to rest in zero position as above described. The cam surface 91 is so shaped as to control the entire movement of the type and control actions both during the actuating stroke or forward stroke of the operating bail frame under the influence of energy stored in spring 133, and during the return or restoring stroke of the operating bail frame. On the return or restoring movement of the operating bail frame energy to effect the succeeding actuating movement is stored in spring 133 by the operation of cam 91. This method of storing energy for effecting the succeeding operating stroke is a new and important feature of the invention.

Cam 91 is so shaped that the maximum allowable time is utilized for carrying the type bars up to the platen and its return, and the type is carried up to and pressed against the ribbon by the energy stored in spring 133 to effect a printing stroke. The impression of the type is effected by a pressure exerted by spring 133 for the entire stroke and no reliance is placed on the inertia of the type bar and the spring action of the type to complete the impression." A delicate control of the printing pressure is therefore possible, and a substantially noiseless printing action with practically no shock is attained. This control of the printing action is an essential feature of the invention in attaining a smooth noiseless operation eliminating the clatter and strain common in previous type bar printers and in increasing the life, reliability and efficiency of the machine. The return movement of the type is also controlled in a manner to prevent bouncing of the type bars as they strike cushion 122 on the return to rest. The type action as shown is balanced and the return is so controlled that if one of the type bars should become hung up for any reason it will gradually work back to rest after a few printing strokes. This tendency of the type bars to work back to rest is largely assisted by the repeated blows of bar 125 on projection 110 of the stuck actuating bar. In this manner a tie up of the printing due to hanging of the type bars on frayed ribbons, accidental lodging of dirt, etc., is avoided. In event anything serious goes wrong in the printer, breakage is prevented by means of spring 146. If the operating bail frame becomes tied up, spring 146 is arranged to give, and permit arm 145 to oscillate about its pivot 144 under the influence of cam 91.

Spacing.

A new and improved form of spacing mechanism is provided whereby the paper carriage is driven directly from the motor in a manner to give a substantially continuous movement to the carriage, the carriage motion being interrupted only for the interval when the type bar pressed the ribbon against the paper. In this manner the spacing time is considerably lengthened and the speed of the carriage movement is correspondingly reduced. As the paper carriage is the heaviest moving part of the printer, this results in a substantial reduction in shock and stress in the machine, and the spacing operation is rendered substantially noiseless. The spacing mechanism is a decided advance over the prior art and is an important feature of the invention.

Mounted on motor shaft 105 is a worm gear 148 (Fig. 1) which drives continuously a worm wheel 149 (Figs. 2 and 3). Worm wheel 149 is mounted loosely on vertical shaft 150 and held in frictional engagement with clutch member 151 rigidly secured to shaft 150 by means of a spring 152. Spring 152 seats on a washer 153 and its compression may be varied by means of nuts 154. This structure forms a constantly engaged frictional driving connection for shaft 150 from the motor. Shaft 150 is supported from frame 138 by means of a bearing bracket 155 in which shaft 150 is journaled. A spacing control ratchet wheel 156 (Figs. 1, 2, 3, 15 and 16) provided with teeth 157 is rigidly secured to shaft 150. Co-acting with ratchet wheel 156 is a spacing control pawl 158 provided with teeth 159 and 160 (Figs. 2, 3, 14 to 16). Pawl arm 158 is pivotally mounted on a spindle 161 supported from cross piece 138 by journals 162 (Figs. 3 and 14). Rigidly secured to and rotatable with spindle 161 is an arm 163 into which is set a pin 164. A spring 165, fastened to arm 163 and an extension of pawl 158, maintains arm 158 yieldingly in engagement with pin 164, and as spindle 161 is rocked, pawl 158 will be oscillated to release ratchet wheel 156 and thereby permit rotation of shaft 150 with worm wheel 149.

Rigidly secured to spindle 161 are two vertical arms 166 which pivotally support a universal operating member 167 (Figs. 2, 3 and 14) at points 168. Operating member 167 is arc shaped in such a manner that a front edge 169 (Fig. 2) is struck by surfaces 170 of type bars 116 to press operating member 167 to the rear and thereby actuate members 166 to rock pawl spindle 161 and move pawl 158 downward in Fig. 2 just before the printing stroke of an actuated type bar is completed. This downward movement of pawl 158 removes tooth 159 from the path of, or engagement with, a ratchet tooth 157 and places tooth 160 in such a position that it will engage the tooth 157 just in time to stop the paper carriage as the type is pressed against the paper. This arrangement permits driving the carriage up to the time the printing occurs.

Operating member 167 is slidably supported in grooves 171 (Fig. 2) of front plate 172 and has secured thereto a guide member 173 (Figs. 2, 3 and 14) which slides in a guide opening 174 in front plate 172. An adjustable stop screw 175 is seated on a lug of guide member 173 and limits the forward movement of operating member 167. A spring 176 (Fig. 14) secured at one end to a pin 178 fastened in spindle 161 and secured at the other end to a support 178 (Figs. 3 and 14), tends to force operating member 167 to the front or left in Fig. 2, and correspondingly, tends to throw pawl 158 upward. Therefore as soon as an actuated type bar has completed its printing and commences to return to rest position spring 176 will operate to give the type bar an initial impulse to restore it to rest and at the same time will raise pawl 158. As above pointed out, a ratchet tooth 157 has come into engagement with tooth 160 of pawl 158. It will be noted the teeth 159 and 160 are slightly displaced so that as pawl 158 is raised by spring 176, the tooth 157 will be past tooth 159 and the spacing mechanism will be set free to rotate until the next tooth 157 on the ratchet is engaged by tooth 159 or 160. It will be remembered that the return of an actuated type bar to rest is controlled by the shape of cam 91, and accordingly, the shape of cam 91 may govern the raising of pawl 158 and the forward movement of operating member 167. Cam 91 is therefore shaped so that the movement of members 167 and 158 occurs substantially without shock or noise. The mechanism may be so designed that tooth 159 will stop shaft 150 only when no character selection is to succeed the printing of the given character. If characters are immediately succeeding each other, tooth 159 will be dropped out of the way of tooth 157 on the ratchet wheel 156 in time to permit rotation of the shaft 150 to continue until tooth 157 engages tooth 160, just in time to stop rotation of shaft 150 and spacing of the paper carriage for the impression of the selected character. Of course if bar 167 is not operated before tooth 159 is reached by the succeeding tooth 157, then 159 will stop rotation of shaft 150 and the spacing movement. After any interval in which tooth 159 has stopped the rotation of shaft 150, there will of course be a slight movement on the next printing operation, caused by the disengagement of tooth 159 and engagement of tooth 160 with tooth 157.

A pinion 179 secured to shaft 150 drives a gear 180 which in turn drives pinions 181 and 182 through a shaft 183 by a connection hereinafter described. Pinions 182 and 183 drive the paper carriage to cause spacing thereof as hereinafter explained. As shown in Figs. 1 and 2, pinions 181 and 182 may be secured rigidly to shaft 150. To relieve the shock of starting and stopping the carriage suddenly however, the modified connection shown in Figs. 17 and 18 may be utilized. In this form of connection pinion 181 is secured rigidly to shaft 150 and is provided with a reduced portion 183 upon which pinion 182 is rotatably seated. A collar 184 rigidly secured to shaft 150 and shouldered against 183 holds pinion 182 in position. A pin 185 rigidly secured in pinion 182 extends upward through a slot 186 cut in collar 184, and has secured thereto a spring 187 which is fastened at its other end to a projection 188 of collar 184. It will be seen that as shaft 150 rotates, pinion 182 is driven by collar 184 through spring 187. Due to the inertia of the carriage parts as the collar 184 commences to rotate, spring 187 will stretch and the carriage is gradually accelerated. When collar 184 stops at the end of a space, the inertia of the carriage will drive pinion 182 until pin 185 strikes collar 184 and spring 187 is restored to normal. In this manner spring 187 operates to absorb the slight shock incident to starting and stopping the carriage. Pinion 181 drives a ball guide rack, and pinion 182 drives the carriage driving rack as will appear hereinafter in taking up the detailed carriage construction.

*Automatic ribbon feed.*

A new automatic reversing ribbon feed is provided in which the ribbon is fed by a direct driving connection from the printer operating bail shaft, rather than from a universal bar actuated by the type bars as has heretofore been common. This results in a more efficient and continuous operation.

Rigidly secured to shaft 129 is a vertically extending arm 189 (Figs. 1 and 13) to which is pivotally secured a link 190. Link 190 at its other end is pivoted to an arm 191 (Figs. 13 and 19) which is free to oscillate on a shaft 192. Shaft 192 and the entire ribbon mechanism is supported from cross piece 193 by suitable supports 194. Rigidly secured to shaft 192 is a vertical arm 195 to which the oscillating motion of arm 191 is transmitted by a coil spring 196 secured at its end to arms 191 and 195. Arm 195 is connected at its upper end by means of a pin connection with a member 197 which in turn is connected to a bar 198 by means of a pin and slot connection at 199. Bar 198 is pivotally supported from arms 200 and 201 which are rigidly secured to vertical shafts 203 and 204. Secured rigidly to the upper ends of shafts 203 and 204 are two similar ribbon actuated arms 205 and 206 (Figs. 1 and 13) which, as they are actuated, shift bar 198 and thereby move arm 197 to the right or left. Arm 197 is turned down at its end to form a shoulder 207. Pivoted below arm 197, to an extension of support 194 (see Fig. 13) is an actuating link 208 with projections 209 and 210 arranged to co-act with shoulder 207 of arm 197. Pivoted to arm 208 at 209 is a pawl actuating and guiding bar 210, the other end of which is slidably supported on an extension of 194 and guided by a screw 211 extending through slot 212. A spring locking member 213 co-operates with V-shaped notches in bar 210 to lock it in either right or left position as shown in Fig. 19. A pair of locking pawls 214 and 215 are mounted in grooves 216 and 217 on extensions of support 94. A pair of driving pawls 216 and 217 are pivotally mounted in grooves 218 and 219 of arms 220 rigidly secured to shaft 192 and a spring 211 is provided (Fig. 21) for each driving pawl. Pawls 214 to 217 are preferably made of spring material and are engaged by members 222 on bar 110 in such a manner that with bar 210 to the left in Fig. 19 pawls 214 and 216 will engage ratchet wheel 223, and with bar 210 to the right in Fig. 19, pawls 214 and 216 will be disengaged from ratchet 223, and pawls 215 and 217 will be thrown into engagement with ratchet wheel 224. Ratchet wheels 223 and 224 drive ribbon spool shafts 225 to the upper end of which ribbon spools 226 (Fig. 1) are secured. As shown in Fig. 1, the ribbon is threaded from the spools through slots in members 205 and 206, and in between the type bars and the platen.

For each actuation of the operating bail shaft 129 by cam 91, arm 191 (Fig. 13) will be oscillated on shaft 192. This oscillating movement is transmitted by coil spring 196 to arm 195 which in turn oscillates shaft 192 and arm 197. An adjusting screw 227 is arranged to limit the movement of arm 195 and the parts operated thereby. The strength of spring 196 is sufficient to actuate the ribbon mechanism, but if anything should tie up in the mechanism this spring will give and prevent breakage of parts. Oscillation of shaft 192 causes pawl 216 to drive ratchet wheel 223 and ribbon spool 226 one step of each actuation of the printer bail operating frame. Feed of the ribbon step-by-step will therefore occur for each character printed until one of the metallic knobs 228 (Fig. 1) fastened to end of the ribbon is drawn against the slot in arm 205. The further stepping of the ribbon by pawl 216 will then actuate arm 205 to throw bar 198 to the left in Fig. 19. A locking and centering spring 229 (Figs. 13 and 20) is provided which co-operates with notches in a collar 230 on shaft 204, to lock arms 205 and 206, and bar 198 in proper positions so that the ordinary feed of the ribbon will not change the position of these parts, and movement of bar 198 will be completed at the proper time. Actuation of bar 198 by the pulling of a knob 228 on arm 205, will throw arm 197 to the left in Fig. 19 about its pin connection with arm 195, to a position where shoulder 207 will engage projection 209 on arm 208. Arm 197 is oscillating continuously but performs no function until the position of bar 198 is changed by actuation of arms 205 or 206 in the manner described. Projections 209 and 210 are made wide enough to prevent the complete movement of arm 195 to the right or left until the point in the forward movement of arm 197 in Fig. 13, when shoulder 207 has passed member 208 or 209 as the case may be. At this point, the V-shaped portion of spring 229 will be forced fully into the proper notch on the collar 230 to bring shoulder 207 in the path of projection 209. On the rearward movement of arm 197, shoulder 207 will catch projection 209 of arm 208 and will operate to swing arm 208 with bar 210 to the right in Fig. 19. Movement of bar 210 to the right throws pawls 214 and 216 out of engagement with ratchet wheel 223, and throws pawls 215 and 217 into engagement with ratchet wheel 224. Oscillation of shaft 192 will then cause pawl 217 to feed the ribbon until the knob 228 on the other end of the ribbon actuates arm 206 to re-engage pawls 214 and 216 to again reverse the ribbon feed.

Carriage construction.

Figure 24:
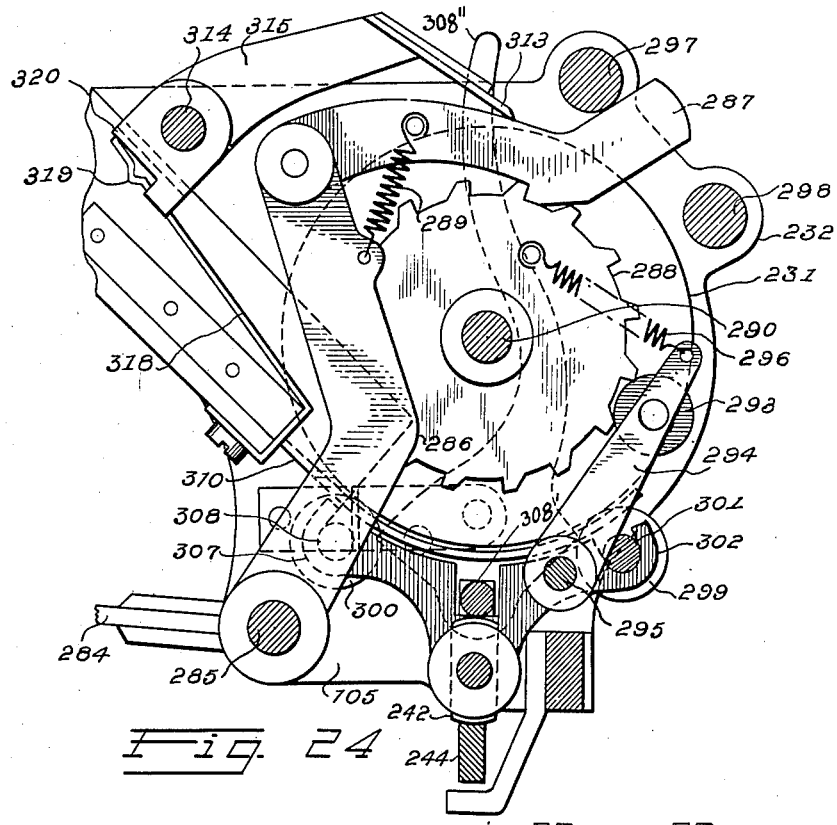
Fig. 24 is a fragmental sectional view of the carriage showing the line feed mechanism.

A novel and efficient form of carriage construction is provided the details of which are improvements over the constructions heretofore in use. A movable carriage frame work is provided upon which is rotatably mounted a cylindrical paper platen 231 of usual construction journaled in end plates 232 (Figs. 1 and 24). A knurled knob 233 (Fig. 1) and a crank handle 234 (Figs. 2 and 3) are provided on extensions of the platen shaft, at the left and right sides respectively of the platen for the purpose of rotating the platen to advance or retract the paper. The carriage frame work is rigidly secured to and supported from a movable rack member 235 (Figs. 1 and 2) which extends along the back of the carriage and meshes with pinion 182 to effect spacing of the carriage by the rotation of this pinion as above described. The under side of rack 235 is grooved and rests on a series of ball bearings 236 (Figs. 2, 15 and 22) which in turn are supported in a ball race 237 fastened to and supported from side plates 2 (Fig. 1). A ball guide rack 238 (Figs. 2, 3 and 15) maintains balls 236 in proper relation between race 237 and rack 235, and is driven with and at one half the speed of rack 235, by pinion 181 with which it meshes. This structure of ball race and guide make possible an anti-friction sliding support for the carriage in which a minimum number of balls is used and in which the balls are never exposed by the movement of the carriage. A cover plate 239 is secured to race 237 to protect the balls against the ingress of dirt from the front and at the same time permits longitudinal movement of the carriage. A roller 240 (Figs. 2 and 15) is pressed against rack 235 by a spring 241 secured to an extension of ball race member 237, and maintains rack 235 properly seated on balls 236 in a manner to permit a longitudinal and pivotal motion of the rack. A plurality of rollers 242 (Figs. 2 and 15) are secured to a cross piece 243 of the carriage frame, and these rollers in turn are supported on a rail 244. The carriage is moved longitudinally along rail 244 and race 237.

Carriage lock and shift mechanism.

Figure 22:
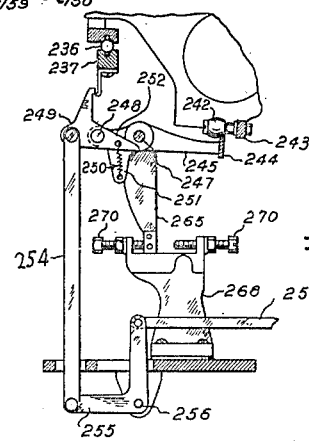
Fig 22 is a fragmental sectional view showing the carriage shift mechanism.

Rail 244 extends across the printer and is carried by arms 245 and 246 (Figs. 2, 3, 22 and 23) which are rigidly secured to and rotatable with a shaft 247 (Fig. 3) journaled in side frames 2. Pivoted to member 245 at 248 (Figs. 3 and 22) is a carriage lock member 249. A spring 250 connected to an extension 251 of 245 and to an arm 252 of lock member 249 throws the upper hook member of 249 forward into engagement with a locking member 253 secured to rack member 237. With the parts as shown in Fig. 22 the carriage is locked in the lower case or unshift position. A link 254 is connected to member 249 at one end and at the other end to a bell crank 255 which is pivotally supported at 256 from the printer frame work. An operating bar 257 (Figs. 2 and 22) connected to bell crank 255 at one end, is suspended from an actuating bar 108 by means of a pivoted connecting link 258 (Fig. 2). A pin 259 fastened to bar 257 slides in a slot in link 258 and a spring 260 normally holds bar 257 in a position to cause engagement of pin 259 with the upper end of this slot. Guide members 261 and 262, secured to bar 108 maintain bar 257 in proper lateral position. A member 263 is secured to the operating bail frame in a manner to engage recess 264 on bar 257 when the operating frame is restored by cam 91 after the actuating bar 108 controlling 257 has been dropped due to a selection.

To shift the carriage, a proper selective combination is transmitted. This causes the shift control bar 108 to drop on the forward stroke of the operating bail frame and interposes notch 264 in the path of member 263.

On the return movement of the operating bail frame, cam 91 functions to force bar 257 to the rear, and at the same time shift control bar 108 is raised out of the aligned selector bar slots in usual manner, the spring 260 of course being stressed and pin 259 will slide along the slot in link 258. This movement of 257 will rock bell crank 255 (Fig. 22) about its pivot 256 and will cause a downward movement of link 254. The initial downward movement of link 254 causes a rocking of lock member 249 about its pivot 248 until arm 252 thereof strikes shaft 247. This movement of 249 unlocks the carriage. Further downward movement of link 254 will rock arm 245 about shaft 247 as a pivot and will raise rail 244. Raising of rail 244 in this manner rocks the entire carriage about balls 236 and raises it to the upper case shifted position. It will be seen that power to raise the carriage to shifted position is supplied directly by action of cam 91, rather than from energy stored in spring 133 as is the case for the printing and other actions. After the shift has been completed, bar 257 is held down by engagement of notch 264 with member 263, until the next forward movement of the operating bail frame, when bar 257 will be freed to return to the normal position shown in Fig. 2 as soon as the carriage is returned from upper case to normal lower case or unshifted position.

*Carriage shift lock and release.*

A lock lever 265 (Figs. 3 and 23) is rigidly secured to and rotated by shaft 247 as the carriage is shifted. Shifting of the carriage causes arm 265 to move to the left in Fig. 22 and to ride over a latch plate 266. Latch plate 266 is tiltably and adjustably mounted on a member 267 pivoted to support 268. A shift release actuating bar 108 is hooked to a pin 269 of member 257. The movement of the carriage is limited by adjustable stop screws 270 which co-act with arm 265. A spring (not shown) normally holds shift release bar 108 to the right in Fig. 23, with a projection 274 against a shelf 275. After the carriage is moved to shift or upper case position, latch plate 266 will lock it in this position, until unshift bar 108 is actuated by the reception of an unshift signal. Actuation of bar 108 on the forward movement of the operating bail frame will actuate member 267 about its pivot and will disengage latch plate 266 and arm 265 to permit the carriage to return to lower case position.

*Line feed mechanism.*

The line feed mechanism is arranged to be actuated on the return stroke of the operating bail frame by means of a bar 276 (Fig. 2) which is linked to and controlled by a line feed actuating bar 108, in the same manner as bar 257 is connected to carriage shift actuating bar 108. Selection of the line feed bar 108 results in a rearward thrust on bar 276, which rocks arm 277. Arm 277 is secured to a spindle 278 (Figs. 2 and 3) which is supported from cross piece 138 by members 279. An arm 280 fastened to and rotated by spindle 278 is pivotally connected to a line feed operating bar 281. Bar 281 is guided against a bracket 282 (Fig. 3) secured to the printer frame work and at its upper end carries a roller 283. Roller 283 engages a plate 284 which is pivoted on shaft 285 extending across the carriage frame. Plate 284 extends across the carriage frame as shown in Fig. 3 so that roller 283 will be in contact therewith during the entire carriage movement. As shown in Fig. 2 roller 283 contacts with plate 284 in directly below the center of carriage ball race 237. This arrangement causes the force for the line feed to be applied to the carriage in a manner to avoid turning the carriage upward about the balls 236 as a center. An arm 286 (Fig. 24) is secured to a shaft 285 and is arranged to be oscillated thereby. A pawl 287 is pivoted to arm 286 and held against ratchet wheel 288 by means of a spring 289. Ratchet 288 is secured to platen shaft 290 upon which platen 231 (Figs. 1 and 24) is rigidly secured. A jockey roller 293 mounted on an arm 294 pivoted to the carriage frame at 295 is pressed against ratchet 288 by means of spring 296. Roller 293 operates in well known manner to center the platen properly. Pins 297 and 298 secured to the carriage frame plate 232 operate to properly guide and limit the motion of pawl 287. Actuation of bar 276 as described cause a downward motion of bar 281 which results in a movement of plate 284. Plate 284 actuates arm 286 and pawl 287 to cause the pawl tooth to engage a tooth of ratchet 288 and thereby rotate the platen 291. Plate 284 will be held down by engagement of the notch in the end of 276 with operating bail member 263, until the next forward movement of the operating bail frame when member 263 will be withdrawn from the notch in 276, and the line feed mechanism will be restored to the position shown in Fig. 24 in readiness for the succeeding line feed operation.

Figure 25:
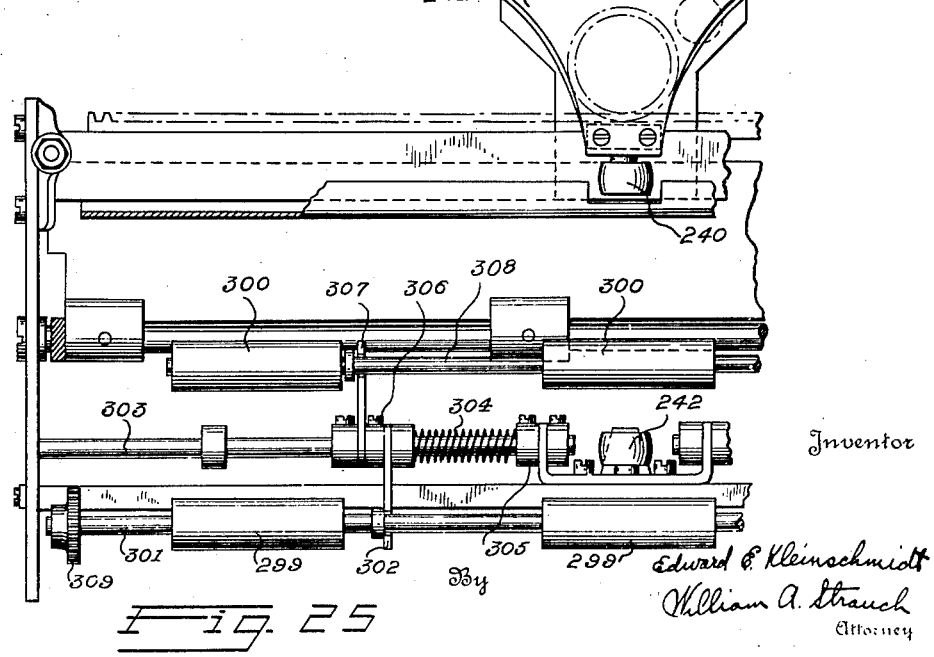
Fig. 25 is a fragmental view showing the paper feed roll construction.

Co-operating with the platen and line feed mechanism is a set of paper feed rollers 299 (Fig. 25) and 300 for holding the paper firmly against the platen and feeding it evenly. Rollers 299 are mounted on a shaft 301 which is rotatably supported by arms 302, one of which is shown in Fig. 25, as the other side of the machine is the same as the half here shown. Arms 302 are loosely mounted on shafts 303 which are journaled from the carriage frame as shown. Fastened to arms 302 are springs 304 which surround shafts 303 and are secured to collars 305 which are rigidly secured to shafts 303. Spaced from arms 302 by collars 306 are arms 307 which are rigidly secured to shafts 303, and which rotatably support shaft 308 carrying rollers 300. This construction of paper feed roller support results in rollers 299 and 300 being pressed equally against the platen by the action of spring 104. A square shaft 308' is rotatably supported from side plates 232 and passes between notches cut in arms 302 and 307. Secured to shaft 308' is an arm 308'', and by shifting arm 308'' shaft 308' is rotated to spread arms 302 and 307 in a manner to relieve the pressure of the rolls 299 and 300 so that paper may be readily shifted. To effect a powerful and positive drive of the paper by the line feed mechanism a pinion 309 is placed on shaft 301 (Fig. 25) which is driven by a gear 309 (Fig. 3) meshing therewith. To properly guide the paper into the platen in a loop a shield 310 (Figs. 1, 2, 3 and 24) is provided with a guide rod 311 (Figs. 1 and 2) supported from shield 310 by means of members 312 (Figs. 1, 2 and 3). A bar 313 (Figs. 1 and 24) is pivotally supported from a rod 314 by arms 315 and 316. To the ends of 313 are secured guide rollers 317 (Fig. 1) by means of members 318. Bar 313 and rollers 317 are pressed against the platen by means of springs 318 (Fig. 24). Notches 319 (Fig. 24) on springs 318 co-act with corner 320 to hold bar 313 and rollers 317 in raised position in obvious manner, when it is desired to start paper around the platen.

The line feed mechanism described is an important feature of the invention, as the power to operate it is directly supplied by cam 91 on the return movement of the operating bail frame. With the co-action of the paper feed rollers and guides, a uniform and extremely powerful paper feed is provided. If the paper is snagged in any way, no tie up of the printer results, as the pull on the paper is powerful enough to tear it completely through. Because of the position of roller 283 in line with the ball race, the heavy line feed pull transmitted to the carriage, causes relatively no tendency for the carriage to shift.

Ribbon shift.

Preferably some means of shifting the ribbon is used to provide for visible printing as the carriage is shifted to print in the upper case. To effect the ribbon shift, an arm 318 (Figs. 2 and 26) is secured to and rotatable with carriage shift shaft 247. Pivotally secured to arm 318 is a member 319 on which is mounted a guide pin 320. (Figs. 14 and 26). Pin 320 is adapted to slide in a slot 321 of a guide member 322 which is rigidly secured to an extension 323 of universal spacing control bar 167. Pivoted to member 319 is a ribbon carrying guide member 324 through the upper end of which the printing ribbon is threaded and guided past type bar guides 118. As surface 170 of an actuated type strikes edge 169 of bar 167 just before a printing impression is made, bar 167 will be shifted to the rear (left in Fig. 26), and member 322 will push on pin 320 and will actuate member 319 to throw the ribbon up into printing position between the type and the platen. As the type bar drops away after printing, spring 176 will return universal bar 167 to the front, and the ribbon will be dropped away from in front of the character impression. When shaft 247 is rotated to shift the carriage into upper case position member 319 will be shifted upwardly guided by pin 320 in slot a sufficient amount to permit proper visible printing in the upper case. Upon the return of the carriage to lower case position, the ribbon will also return to the position shown in Fig. 26.

Tabulating device.

Figure 15:
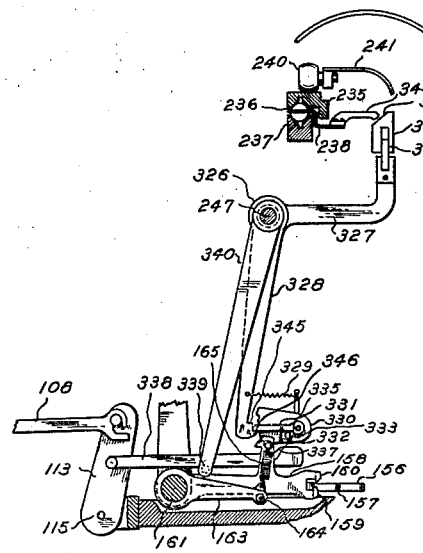
Fig. 15 is a fragmental view showing the spacing control pawl and details of the tabulating device.
Figure 16:
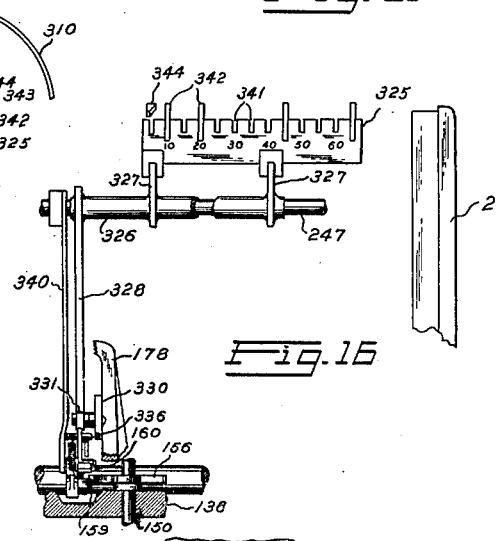
Fig. 16 is a fragmental rear elevation showing spacing and tabulating mechanism details.

A novel tabulating arrangement is provided for spacing of the carriage without special spacing signals for each step. This permits rapid division into paragraphs and the rapid transmission and reception of data in tabular form. A tabulating plate 325 (Figs. 3, 15 and 16) is supported from a sleeve 326 by integrally formed arms 327. Sleeve 326 is rotatably supported by shaft 247 and has an arm 328 formed integrally thereon. A spring 329 (Fig. 15) secured to an extension plate 330, secured to 178, tends to force arm 328 to the right in Fig. 15 into engagement with a latch 331 which is mounted pivotally on plate 330. A spring 332 holds latch 331 against a pin 333 mounted on plate 330. Plate 330 is supported by and extends rearwardly from member 178. Extension 335 of pawl 158 is arranged directly beneath latch member 331. A pin 336 secured to extension 335 is arranged to coact with a cam surface 337 of tabulating actuating bar extension 338. Extension 338 is pivoted to a member 113 which as above described is actuated about pivot 115 by the selection and operation of a tabulating control bar 108. A supporting and guide pin 339 against which extension 338 rests is carried by arm 340 secured to shaft 247. The function of arm 340 is simply to support and guide extension 338. A series of notches 341 are cut into plate 325 and a plurality of members 342 provided with cam surfaces 343 are adapted to be inserted in the slots 341 at will in the manner shown. A cam member 344 is fixed to the end of ball guide rack 238 (Figs. 3 and 15).

When it is desired to tabulate, the proper signal is sent to selectively actuate tabulating bar 108. As the operating bail frame moves 108 forward, 113 will be rocked to move extension 338 to the left in Fig. 15. This movement of 338 will displace cam spacing pawl 158 upwardly by means of pin 336 until pawl 158 is raised entirely clear of spacing control ratchet wheel 156. The upper end of pawl extension 335 will then have pushed latch 331 above shoulder 345 of arm 328, and spring 329 will then shift arm 328 to the right in Fig. 15 and shoulder 346 of arm 328 will be hooked under the shoulder formed on pawl extension 335. In this position of parts the spacing mechanism will be free to rotate, cam surfaces 343 will be thrown forward into the path of cam member 344 on rack 238, and pawl 158 will be hooked up above the ratchet wheel 156, with spring 165 stretched and tending to return it to the position shown in Fig. 15. Rotation of the spacing mechanism will move the carriage to the right in Fig. 16 until cam member 344 engages the first cam surface 343 interposed in its path. Engagement of a cam surface 343 will rock sleeve 326 about its pivot sufficiently to free pawl extension 335 and permits restoration of latch 331 under the influence of spring 332 to the initial position shown in Fig. 15. Pawl 158 will then drop under the influence of spring 165 to the normal position shown in Fig. 15 with its teeth 159 and 160 arranged to stop the spacing movement of the carriage.

It will be apparent that the spacing movement of the carriage may be regulated as desired by locating the position of notches 341 and stop 342 in proper manner. While spacing for tabulating purposes the carriage movement is continuous, and is not step-by-step as in the spacing between printing of characters.

*Carriage return.*

A novel and considerably simplified mechanism is provided to effect the carriage return. As pointed out in connection with the spacing drive description, power is transmitted to shaft 183 (Fig. 27) by means of gear 180. Gear 180 is loose on shaft 183 and has formed integrally therewith a toothed clutch member 345 which is arranged to engage a co-acting clutch member 346 secured to and rotatable with shaft 183. In the position shown gear 180 will drive shaft 183 through member 346 to effect the spacing. A spring 347 abuts against an end piece 348 secured to a sleeve 349 and normally holds clutch members 345 and 346 in driving relation. The upper end of sleeve 349 is tightly secured to a member 350 which is rotatably mounted in a bearing member 351 supported frame carriage track or ball race 237 (Fig. 28). Rigidly secured to and rotatable with member 350 is a ratchet wheel 352. Ratchet wheel 352 abuts against bearing member 351 and thereby takes up the end thrust due to the compression of spring 347. Pivoted to bearing member 351 by means of a pin 353 is a pawl member 354. A spring 356 (Fig. 27) is provided which holds tooth 357 (Fig. 29) normally in engagement with ratchet 352. A helical spring 357 is secured at 358 to shaft 183 and coils upward around this shaft to a point where it is led out through a slot in sleeve 349 and fastened thereto by winding several times around sleeve 349 and 359. Shaft 183 is supported at its lower end by an adjustable step bearing 360 secured to cross piece 138, and at its upper end has secured thereto a ball bearing race member 361 which rotates against balls 362 (Fig. 27) in bearing member 351. Shaft 183 is not secured to end piece 348 nor to member 350 and is freely rotatable in these members. It will therefore be apparent that as shaft 183 is driven to space the carriage it also winds spring 357 and stores energy to effect the carriage return sleeve 349 being held against rotation by the operation of ratchet 352 and pawl 354. The tension of spring 357 may be regulated easily by simply rotating sleeve 349 clockwise in Fig. 29 and then oscillating pawl arm 354 to alternately engage teeth 357 and 358 with ratchet wheel 352 to relieve the excess tension. Spring 356 normally holds pawl 354 in the position shown in Fig. 29 and prevents release of the spacing spring due to shock of operation.

A pair of prongs 363, mounted on a square shaft 364 are adapted to engage the lower surface of gear 180. Shaft 364 has reduced circular end sections 365 and 366 upon which it is supported from cross piece 138 by members 367. To section 366 is rigidly secured an operating arm 368. A member 369 is pivotally mounted on section 366 and is adjustably secured to arm 368 by means of a cap screw 370 passing through slot 371 in member 369 and clamping member 369 in a manner to be movable with arm 368. A carriage return actuating bar 108 is pivoted to arm 368. An adjustable stop screw 372 is provided for member 369. Pivotally secured to member 369 is a link 373 which is movable vertically in a guide slot (Fig. 30) of a latch plate 374 which in turn is supported from carriage ball race 237. A spring 375, connects a pin 376 fastened to latch plate 374 and link 373, in a manner to urge link 373 to the right in Fig. 27, against the latch plate. A pin 377 on carriage drive rack 235 is positioned to engage extension 378 of link 373 and to hold link 373 out of engagement with latch plate 374 when the carriage is restored to its start position. When the carriage has been stepped one or more spaces pin 377 permits spring 375 to throw link 373 against latch plate 374. A slot 379 is cut into link 373 in a manner to cause the upper shoulder formed thereby to slide over the bottom of the latch plate slot under the influence of spring 375 when 373 is raised, with the carriage moved away from its start position. A dash pot 379' (Fig. 3) of usual construction is provided to deaden the shock of stopping the carriage.

To effect the return of the carriage, carriage return actuating bar 108 is selected and operated by transmission of a proper signal. This results, as above explained, in a forward movement of actuating bar 108 which actuates arm 368 to tilt prongs 363 thereby disengaging clutch members 345 and 346. At the same time member 369 is actuated to raise link 373 sufficiently to hook the shoulder formed by slot 379 on latch plate 374. Latching up of 373 holds prongs 363 in a position to maintain members 345 and 346 in disengaged position. As soon as members 345 and 346 are disengaged, the stored energy in spring 357 will be released to return the carriage to start position. When the carriage reaches start position, pin 377 will re-engage extension 378 and will move 373 to the left in Fig. 27. As soon as 373 is clear of locking engagement with latch plate 374, spring 347 and the weight of the parts will cause re-engagement of clutch members 345 and 346. The carriage will then be in position for the commencement of a new line.

*Combined carriage return and line feed.*

As in practically all cases where the carriage is returned, a new line must be started, it is preferable where keyboard transmission is used, to actuate the line feed with the carriage return, in addition to the line feed actuating mechanism hereinbefore described. This reduces the number of signalling impulses by the amount of one character interval for each line and allows an increase in the signalling speed, by eliminating the line feed signal at the end of each line. To effect this, shaft 278 (Fig. 3) is simply extended sufficiently to secure thereto an operating arm 380 (Fig. 3) similar to arm 277 (Figs. 2 and 3) and provide a line feed operating bar 276 to be controlled by and linked to carriage return actuating bar 108 in the same manner as described for the line feed actuating bar 108 and the bar 276 controlled thereby. With this addition, the carriage return will be operated by the forward movement of the operating bail frame and the line feed mechanism will be actuated by the return movement of the operating bail through the thrust on bar 276 and the resultant rocking of the frame arm 380 and shaft 278.

Where tape transmission is used little is gained by the operation of both line feed and carriage return by the same signal, as an interval must be allowed on the tape for the time taken up by the carriage return, and this interval may be taken up by a line feed signal. In this case arm 380 and its connected bar are simply removed.

*Signal bell and selector bar lock.*

A novel signal bell arrangement is provided in which the blank signal combination or no impulse combination is utilized to operate a signal bell, and the signal bell actuating bar at the same time functions as a locking device for the receiver selector bars.

Figure 31:
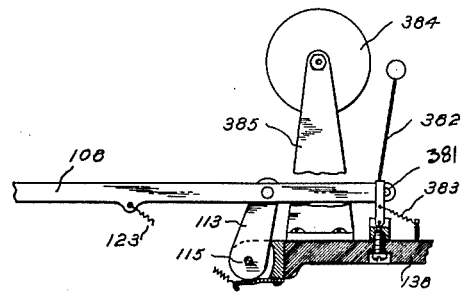
Fig. 31 is a fragmental sectional view of a signal device.

A signal bell bar 108 (Figs. 2 and 31) is extended and carries a pin 381 which engages a pivoted bell clapper 382 and actuates it against the tension of spring 383 as bar 108 is operated. Clapper 382 is arranged to strike a bell 384 supported by standard 385, once for each forward movement of the bar 108.

A special slot 386 (Fig. 32) is provided in each of the selector bars 59 to 63. These slots are so arranged that when the respective bars 59 and 63 are unactuated, notches 386 will be directly under signal bell actuating bar 108, and if the printer is then started into operation this bar 108 will be actuated to ring the bell once for each revolution of cam 91. If any of the bars 59 to 63 are selected, however, the selected ones will be moved to the relative position shown in Fig. 32, and a locking notch 387, provided on each of the bars 59 to 63 will be moved underneath signal bell bar 108. Now as the printing bail frame moves forward, all the bars 108 will be lowered, and beveled edge 388 of signal bell bar 108 will drop into notches 387 of the actuated selector bars, and will enter slightly into notches 386 of the unactuated selector bars. The selected type actuating bar 108 will continue its movement into the aligned slots as before described, but the signal bell actuating bar will have taken a position to lock all the bars 59 to 63 until the selected operation has been completed, and signal bell bar 108 has been raised clear of slots 386 and notches 387.

It will be seen that when a circuit arrangement is used in which a marking condition or open circuit condition in the first signal intervals starts the printers into operation, a succession of marking intervals thereafter will cause ringing of the bell. Where open circuit conditions comprise the marking signal, a blank signal combination, or simply opening the line will cause this bell to be rung. Therefore by simply opening the line any receiving station can cause ringing of these bells at all the stations along and cause a break signal at the transmitting station by ringing its printer signal bell. Any break down of line service will also be indicated by ringing of bells 384 in all the printers in the manner described.

In a line circuit where impulses of reversed polarities are used a polarized relay line relay controls a local circuit through the printing magnet. By applying a light biasing spring to the armature of the polarized line relay in a manner to throw the relay armatures over to the local spacing contact when the line is opened as well as when marking impulses are received, printer bells 384 will ring either on the transmission of a series of spacing signals or on the opening of the line as above explained.

*Electrical contact operation.*

Figure 23:
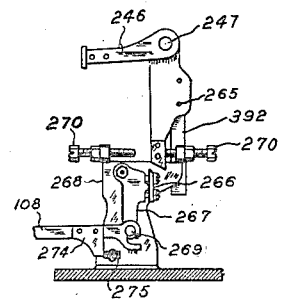
Fig. 23 is a fragmental sectional view showing the carriage shift lock.

It is desirable to provide a special means for actuating electrical circuit controlling contacts. A contact operated only when the carriage is shifted, by operation of the J actuating bar 108 is shown in Figs. 23, 33 and 34. An extension 388 (Fig. 33) of the J bar is hooked to and actuates an arm 389, pivot to standard 268. Arm 389 has adjustably secured thereto a contact operating member 390 which has an extension 391 (Figs. 33 and 34). Secured to carriage shift locking arm 265 is a spacing stop member 392 (Figs. 23, 33 and 34) with a shelf extension 393, and contact springs 394 and 395 separated by insulation 396. Secured to spring 395 is an operating cam block 397.

To operate contacts 394 and 395, a shift signal must first be sent to lock the carriage in the upper case. With the carriage locked in the upper case, shelf 393 and contacts 394 and 395 are placed in a position to be engaged and operated by extension 391 of member 390. The J bar 108 is then operated and causes extension 388 to rock extension 391 downward in Fig. 33 to contact with cam block 397. As the movement of 391 continues downward the contacts will be closed and before the J type bar 116 is carried up far enough by the action of spring 133 to operate the universal spacing bar 167, extension 391 will engage spacing stop shelf 393 and will hold the type action against further movement, until the return movement of the operating bail frame when the J type 116 will return to rest position. In this manner each time the J signal is sent while the carriage is in the upper case position, contacts 394 and 395 will be closed, to ring a special bell, start motors or perform any desired control operation. The closing of these contacts can be repeated indefinitely by the J or any other chosen type bar, without effecting a spacing operation. This simple method of preventing spacing when a type bar is used to actuate signals is novel and a feature of the invention. After signalling is completed, the unshift signal is sent to restore the carriage to lower case position, as hereinbefore described.

If it is desired, contacts can obviously be added which will be closed each time a special actuating bar 108 is actuated by fixing contacts similar to 394 and 395 to be operated by a member similar to 389, 390 and 391 each time the special bar 108 is operated.

*Keyboard transmitter.*

A new and greatly improved keyboard transmitting mechanism is provided in which a complete overlap is provided, in that an entire character may be stored. This is effected in entirely mechanical manner, without resort to a bound keyboard, and by an extremely simplified mechanism. Although the form shown is adapted especially to operate with the particular form of receiver in order to give interchangeable tape or keyboard transmission as pointed out above, and a special drive connection is provided.

Occasion is again taken to outline the state of the art in order to clearly set forth the advance made and to define the scope of the improvement in the transmitter. A rotary and endwise movable shaft or barrel is utilized to operate a transmitting contact. The transmitter shaft carries projecting pins and is similar in appearance to the receiving selector cam shaft, but differs in operation inasmuch as the pins in the receiving selector operate as cams to move the selector fingers, while in the transmitter, the pins engage cams interposed in the paths thereof to cause endwise movement of the shaft to variably actuate the transmitting contact. It will be seen that the principle of utilizing rotary and axial movement of a shaft has been adapted for use for the first time to operate a transmitting contact. Adaptation of the combined rotary and endwise movement to operate a transmitting contact has been heretofore accomplished as disclosed by Wright in U. S. Patent No. 1,052,548, in a start-stop keyboard transmitter. Wright uses a rotary cam shaft to move a plate endwise in accordance with selective combinations of four elements. Endwise movement of the plate operates this contact. Although Wright uses two transmitting contacts to send eight impulses, it will be obvious to those skilled in the art that one only of these contacts could be utilized to transmit the five unit code by changes well within the skill of an ordinary mechanic, and without the exercise of invention. The present transmitter is therefore an improvement over the broad principles found in the Wright transmitting selector. The simplification of the transmitting mechanism over that of Wright, made possible by the utilization of cams to shift the rotary shaft axially, and the improved overlap keyboard arrangement constitute a wide advance and a decided improvement over the Wright or other prior art single or multiple contact transmitters and it is these improvements over the principle disclosed in the Wright patent to which claim is laid.

Figure 36:
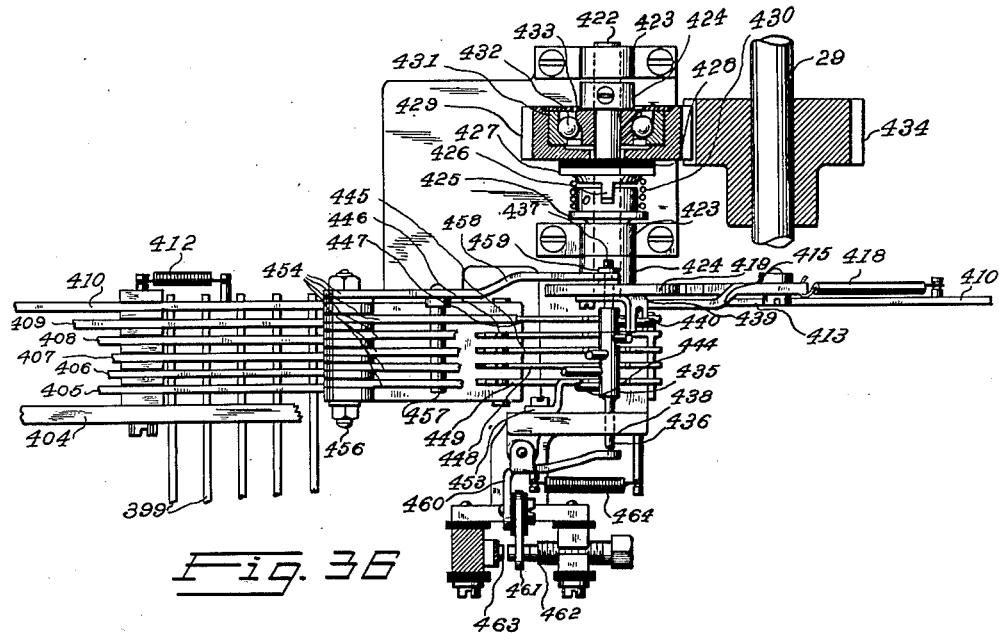
Fig. 36 is a fragmental plan view of the keyboard mechanism.

The keyboard transmitter is supported in a frame 398 (Figs. 1 and 2). A plurality of key bars 399 (Figs. 1, 2, 35 and 36) are pivoted on pivot members 400 and 401 (Fig. 2) which extend across the frame and are held with the key knobs in upward position by means of springs 402. The keys are kept in proper relative position by means of guide plates 403 and 404. A plurality of endwise movable selector bars 405 to 409, and a clutch control bar 410 are slidably supported from frame by proper end guides and supports. Each of the bars 405 to 410, have cut in the lower edges thereof a series of cam notches which are arranged in well known manner to co-act with the key bars to set the selector bars 405 to 409 in the various selective combinations. Bar 410 is moved to the right in Figs. 35 and 36, by actuation of any key bar 399, and as soon as the depressed key bar is released it is restored to its initial position by a light spring 412. Bars 405 to 409 are floating and remain in the position where last set until a different position is required in a succeeding selective combination.

Pivotally mounted on an extension of clutch control bar 410 is a member 413 (Figs. 35 and 36) provided with extensions 414 and 415. Extension 414 is held in engagement with a projection 416 of a pivoted stop arm 417 by means of a spring 418. Arm 417 is held against a cam 419 by a spring 420 and in the position shown acts as a stop to prevent rotation thereof. A pin 421 carried by cam 419 is arranged to engage arm 415 and depress 413 to disengage 414 and 416 when cam 419 is permitted to rotate. Cam 419 is rigidly secured to a spindle 422 (Fig. 36) which is rotatably supported in journals 423 and held properly spaced by collars 424 secured thereto. Securely fastened to spindle 422 is a member 425 provided with key slots into which projections 426 of clutch member 427 slidably fit. Clutch member 427 is slidably mounted on spindle 422 and is pressed against a friction disc 428 and a driving gear 429 by means of a spring 430. Gear 429 is provided with a hardened ball race 431 which is adapted to rotate on balls 432, which in turn are supported on a ball race 433 mounted on spindle 422. Members 431 and 433 are shaped to take up the end thrust on gear 429 due to the compression of spring 430. Gear 429 is driven continuously from shaft 29 (Figs. 2 and 36) by a gear 434. The teeth on gears 429 and 430 are slightly spiral in shape, and are so arranged that they slide easily into driving relation, so that the keyboard may be slid into and out of operative relation with the printer drive shaft while the printer is in operation. The keyboard mechanism is not secured to the printer frame in any way but simply slides into and out of operative relation with respect thereto.

A cam shaft 435 is provided with reduced end extensions 436 and 437 which are rotatably and slidably supported in member 438 and a recess in the end of shaft 422 respectively. Secured to cam 419 is a driving shelf member 439 into a slot in which a cam 440 secured to cam shaft 441 slidably fits. As cam 419 rotates it drives shaft 435 by means of shelf 439, and cam 440. Spaced regularly at angular distances of 55 degrees from cam 440 and from each other and in axially displaced relation along shaft 435 are pins 441, 442, 443 and 444. A plurality of cam members 445 to 449 are pivotally mounted at 450 and each cam member is disposed above and secured to one of the bars 405 to 409 respectively by means of springs 451 and 452 secured to projections of the bars and downward extensions of the cam members. When the bars 405 to 409 are moved endwise by the depression of a key, cam members 445 to 449 will be pivoted upward into the paths, or downward out of the paths, of pins 440 to 441 respectively as the pin shaft rotates. A start interval cam 453 is fixed to support 438 and is placed in the path of pin 444. A plurality of locking members 454 with V shaped notches 455 are pivoted at 456 and held downward against a pin 457 by means of springs 458' individual to each of the members 454. Pin 457 is carried by an arm 458 pivoted at 456 on one end, the other end being supported by a pin 459 secured to cam 419, when the parts are in zero position as shown in Fig. 435. When cam 419 starts into rotation, arm 458 will be permitted to drop and locking members 454 will move downward to bring one or the other of the notches 455 into engagement with the V shaped extensions of cam members 445 to 449. This movement of members 454 forces cam members 445 to 449 into their extreme upper or lower positions and locks them until the revolution of cam 419 is substantially completed and member 458 is again raised by pin 459 to disengage members 454 from the cam extensions.

Cam shaft extension 436 engages a pivoted contact carrying member 460, upon which is mounted a contact member 461. Contact member 461 is held against an adjustable back contact 462 by means of a spring 464. Spring 464 also operates to hold cam shaft 435 in a normal unactuated position.

*Transmitter operation.*

Figure 35:
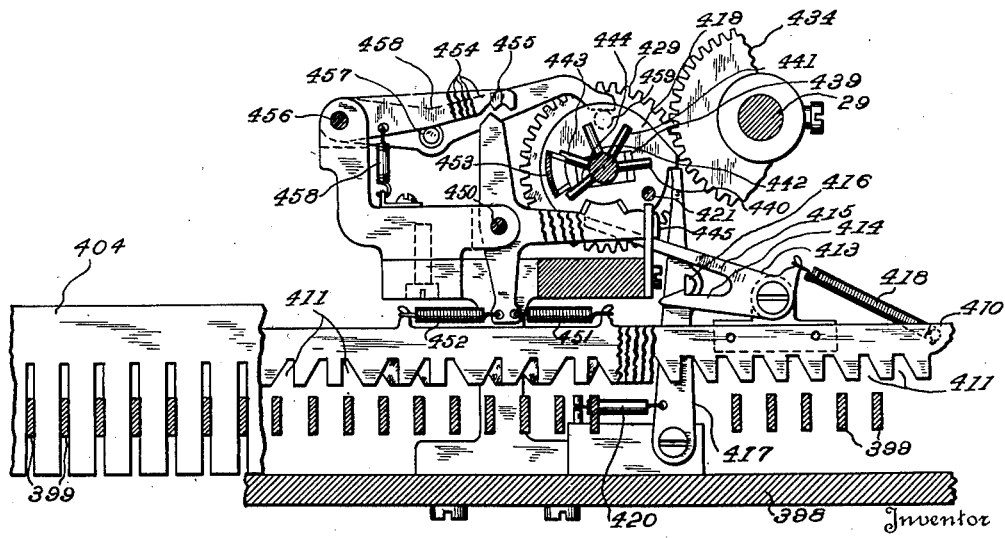
Fig 35 is a fragmental sectional front elevation of the keyboard transmitting mechanism.

The rest or zero position of the keyboard transmitter is as shown in Fig. 35. To transmit a code combination, the corresponding key is depressed with the result that clutch control bar 410 is shifted to the right against the tension of spring 412, and the bars 405 to 409 are shifted to the right and left in combination according to the key depressed. Movement of bar 410 to the right causes member 413 to pull stop arm 417 out from engagement with the projection of cam 419. It will of course be understood that shaft 29 and therefore gears 434 and 433 are rotating continuously. As soon as arm 417 is shifted by bar 410, the cam 419, shaft 422 and shaft 435 will be rotated with gear 433 through clutch members 427 and 428. As soon as rotation of the cam shaft commences, pin 444 will ride up over fixed cam 453 and will cause an axial or endwise movement of shaft 435 which will rock member 460 on its pivot against the tension of spring 464, and will throw contact 461 against 463 to transmit a start condition. This start condition is invariably caused to precede each combination of marking and spacing conditions. As rotation of the cam shaft continues, pin 444 will ride over cam 453, and during this interval or shortly thereafter, pin 421 will engage extension 415 of member 413 and will rock 413 about its pivot to disengage extension 414 from projection 416 of arm 417. Arm 417 will then be moved by its spring 420 into position to stop the rotation of cam 419 and the cam shaft at the end of a complete revolution.

The movement of bars 405 to 409, through springs 451 and 452 raises or lowers the cam members 445 to 449 and throws the V shaped extensions to the right or left in Fig. 35 depending on the motion of the respective bars 405 to 409. The cam extensions are then positioned under the notches 455 of their individual locking members 454. When this positioning of the cams has occurred, pin 459 has rotated to a position where arm 458 will be permitted to drop. Members 454 will then move under the influence of springs 458' until notches 455 engage their respective cam member extensions and will lock cam members 445 to 449 in raised or lowered position as the case may be. After the start interval has been completed, if cam member 445 is locked in lowered position, it will be out of the path of pin 440, and spring 464 will accordingly throw contact 461 from contact 463 to contact 462 and will at the same time restore pin shaft 435. If cam member 445 has been locked in raised position then it will be in the path of pin 440, and the cam shaft will be prevented from restoring thereby maintaining contact 461 against contact 463. In similar manner the positions of cam members 446 to 449 will determine the position of contact 461, as the pins 441 to 444 will co-act with these members respectively in a manner similar to the co-action of member 445 and pin 440. It will be noted that pin 444 serves to transmit the start impulse or condition and the sixth impulse or condition, while pin 440 serves to transmit the second impulse or condition and also form a driving connection for the pin shaft. After pin 444 has rotated past cam member 449, spring 464 will restore the cam shaft and at the same time cause contact 461 to engage contact 462 and thereby transmit the seventh impulse or stop condition to the line. This stop condition is always the same, and the parts are so arranged that it is equal to 30 degrees of angular rotation of the cam shaft to correspond with the division of the receiving cam shaft selector. The start condition is for the purpose of starting the receiving cam shaft into rotation, and the stop condition is to insure the stopping of the receiving cam shaft. It will of course be understood that the spacing and relation of the pins as given is for equal speeds of rotation of the receiving and transmitting shafts. If desired the angular spacing between the transmitting pins may be reduced and the angle of the stop condition may be correspondingly increased to provide for operation of the keyboard transmitter at a slightly lower speed than the receiver and still permit interchangeable keyboard and tape operation.

During the seventh or stop signal interval, pin 459 will engage and raise arm 458, and pin 457 will accordingly raise members 454 thereby releasing cam members 445 to 449 to take up a succeeding selection. Even if the depressed key is held down, after the revolution is completed stop arm 417 will bring the cam 419 and connected parts to rest, and before another character can be sent, the depressed key must be released. If another key is depressed before the first is released bar 410 will be prevented from restoring and no character will be transmitted. As soon as pin 459 moves from in under arm 458 and the selection is locked up, the depressed key may be released, and bar 410 will then restore to the left under the influence of spring 412. When bar 410 has restored, member 414 will hook over projection 416 of arm 417 under the influence of spring 418.

Keyboard overlap.

As above pointed out, the selection is locked up as soon as members 454 are permitted to drop. As soon as the lockup has occurred, and the depressed key has been released, another key may be depressed which will again shift bar 410 to move arm 417 out of the path of the stop projection on cam 419, and will selectively shift the bars 405 to 409 into a new combination. Until locking members 454 are raised, this movement of bars 405 to 409 will simply vary the tensions of springs 451 and 452 by those bars which have their positions changed in the new selection. Then, as soon as members 454 are raised, the cam members will take positions according to the varied tensions in springs 451 and 452. The members 454 will then again lock up the new selection as above described and a third selection may then be set up.

The speed of the transmitter is preferably set to run at sixty to eighty or more words a minute. If the transmitting operator is faster than the transmitter, the transmitter and printer operating at equal speeds will not stop at every revolution but will operate continuously for a number of revolutions at a time, until the operator slows up. If the operator is slower than the transmitter, the transmitter and receiver will stop each revolution. Due to the fact that pin 440 releases member 414 from engagement with 416 after the selection has been locked up a peculiar touch is given to the keyboard by the relieving of the tension of spring 420 on bar 410 which will indicate to the experienced operator when to release the depressed key, and to depress the succeeding key. The speed of operation of the transmitter is so high, however, that the ordinary operator cannot operate the keys fast enough to keep up with the transmitter speed. It will be further noted that the keys need not be depressed all the way as a slight movement thereof is sufficient to throw the V shaped cam member extensions partly into one or the other of notches 455, and members 454 will then positively shift the cam members 445 to 449 to complete their motion.

The lightness of parts permits very high speed operation of the transmitter which eliminates the necessity of providing a bound keyboard. A wide margin of operation and an overlap is provided with a simplity of structure heretofore unattained in the art. The difference in weight of parts usable and simplicity of mechanical structure which permits the attaining of and overlap and such high speed operation of the transmitter as will eliminate the bound keyboard heretofore found necessary is a decided advance in the art.

Speed adjustment.

To avoid employment of skilled operatives and loss of time in regulating the speeds of motors at different stations a special regulating and adjusting means is provided whereby an ordinary operator can speedily bring her machines up to a speed within the working limits.

Mounted on motor shaft 105 is a governor disc 465 (Fig. 37) which carries a flat strip spring 466. Spring 466 has secured thereto weights 467 and is secured to disc 465 by a slot and screw connections in a manner to permit flexure of spring 466 due to the centrifugal force exerted by weights 467 thereon. A contact operating member 468 is mounted in the center of spring 466. Pressed against member 468 by means of a coil spring 469 is a pivoted contact bearing arm 470. Arm 470 carries a contact 471 which is normally held against contact 472 by the pressure due to governor spring 466. Contact 472 is carried by an adjustable screw 473 which is adapted to turn in a fixed nut 474 supported from the printer frame. Screw 473 has formed integrally therewith a gear member 475 which meshes with and is arranged to be rotated by a gear 476 mounted on a spindle 477. A member 478 supported from a recessed portion of gear 475 and upon which 475 is rotatable is held in place by means of a slot formed therein and pins driven through 475 into the slot. Formed integral with member 478 is a bearing extension 479 in which one end of spindle 477 is journaled. The other end of 477 is supported by means of a flexible coupling 480 from an adjusting rod 481. Rod 481 extends through and is journaled in base plate 1 and is provided with a knurled knob 482 (Figs 1 and 37). As knob 482 is rotated it will be obvious that contact 472 will be moved to the right or left in Fig. 37. Contacts 471 and 472 are preferably arranged to normally short circuit a motor armature resistance when closed. As the motor speeds up, spring 466 will be flexed to the right in Fig. 37 under the stress exerted by the rotating weights 467. This will gradually permit contacts 471 and 472 to separate and thereby insert the resistance in the motor armature circuit. The result will be that when contacts 471 and 472 are opened the motor speed will decrease and when they are closed it will increase. The average speed of the motor will obviously be determined by the position of contact 472 as this determines the amount of flexure necessary in spring 466 before contacts 471 and 472 open, and the flexure of 466 is dependent on the motor speed. The speed of the motor may therefore be regulated by turning knob 482 from the front of the machine.

To indicate to an ordinary operator with no technical knowledge when a proper motor speed has been reached in regulation, a tuning fork 483 (Figs. 1 and 37) is supported from the printer frame and has secured to the ends thereof plates 484 which are adapted to overlap and separate alternately with the vibration of the prongs of the fork. Plates 484 are disposed directly above a stroboscopic wheel 485 of special design which is secured to and rotates with drive shaft 29. Wheel 485 has arranged thereon three rows of black spaces. The black spaces are of uniform width on each row but the number in each row varies making the white spaces between the black spaces of different widths in each row as shown in Fig. 2. A hammer 486 (Fig. 37) is pivoted to side frame 2 and normally held against the frame by means of a spring 487. A button 488 mounted in frame 2 is arranged to shift hammer 486 against fork 483 in a manner to strike a blow and start the fork into vibration.

The period of vibration of the tuning fork and the spacing of the black on the wheel 485 are so arranged that when the fork is vibrating and the speed of the motor is proper for operation, the center row of black spaces on wheel 485, when viewed through the vibrating plates 484 will have the appearance of being at rest. This is caused by the opening of plates 484 each time a black space passes beneath. The outer rows due to their difference in spacing of the black, will however give an appearance of rotating in opposite directions. The outer rows are so arranged with relation to the speed that so long as they appear to be rotating in opposite directions the speed of the machine is within the permissible range of operating speeds with relation to the other stations.

To bring the machine up to proper speed it is simply necessary for the operator to press button 488 to start vibration of the fork, and while the fork is vibrating, rotate knob 482 until the outer rows of black marks on wheel 485 give the appearance of rotating in opposite directions. This requires no special skill and may be very speedily accomplished. A great saving of time and labor in the operation of the system is effected by this speed governing and regulating method.

*Remote motor control.*

Special circuit arrangements are provided whereby all the motors on the line are started by the opening of the line or commencement of transmission at any station, and whereby the motors are all stopped by the transmission of a special code signal. This special control is very important in effecting economical operation particularly of news distributing and press circuit systems, where operation is in the hands of inexperienced and careless help who permit the useless operation of motors with the attendant wear when no transmission is taking place.

Referring to Fig. 39, a system using current and no-current marking and spacing line conditions is shown. The receiving magnets 8 and the transmitting contacts 461 are connected in series in the line. Line current is supplied by batteries 489 and transmission and reception occurs as above described. Motors 490 drive motor shafts 105 and the energizing circuit of each motor is closed by the armature 491 of a marginal motor control magnet 492 at each station. At each station a high resistance 493 is connected in series with the line, and is adapted to be short circuited by the closing of a motor stop key 494. A motor start and break signal key 495 is arranged in series with the line at each station.

Magnets 495 are so wound that when any of the resistances 493 are short circuited by closing a key 494 there will be sufficient line current to cause picking up of all armatures 491. With all the keys 494 open there is insufficient line current to pick up armatures 491 but sufficient to hold armatures 491 after they are picked up.

With the armatures 491 picked up, all the motors 490 will be at rest. As soon as the transmitter at any station starts operating, or the line is opened by operation of a start key 495, the magnets 492 will be de-energized and armature 491 will close the motor energizing circuits, thereby starting all the motors simultaneously.

To stop the motors from any station by a special signal combination, the system shown in Fig. 39 may be modified by eliminating resistances 493 and keys 494 and inserting therefor at one station only a resistance 493' controlled by a contact member 496' as shown in Fig. 41 which is operated by a printer bar 108 either in the upper or lower case position as hereinbefore described. Actuation of this special contact operating bar 108 in the printer will shift 496' to 497' and short circuit resistance 493'. This will cause an increase of line current which will operate all the magnets 492 as above described to stop all the printers.

This may also be effected by eliminating resistances 493, keys 494, and batteries 489 from the circuit shown in Fig. 39 and inserting at one end of the line the divided battery 489' controlled by contacts 496', 497' and 498'. Contact 496' is operated by a special printer actuating bar 108 as in the modification of Fig. 41. In normal operation, the line circuit is completed from ground through battery 498', contact 497' printer contact 496' and to the line. When it is desired to stop the motors from any station, a signal or signals are transmitted to cause contact 496' to shift to 498'. This will send an increased current over the line of sufficient strength to pick up armatures 491 and open the motor circuits. Contact 496 will be returned against 497 when the printer cycle has been completed, and the normal current will again be on the line. As in the other forms opening of the line or commencement of transmission will permit armature 491 to drop back and close the motor circuits.

A special press or news distributing circuit is shown in Fig. 40. In this circuit a single transmitting station is provided from which messages are sent by means of combinations of positive and negative impulses by transmitter contact 461. The receiving magnets 8 are in a local circuit controlled by polarized line relays 499. If it is desired to use the blank or all signal combination to operate a signal bell light biasing springs may be provided to move the tongues of line relays 499 to the local spacing contact when the line circuit is opened. If this signal bell is not to be used these light biasing springs may be eliminated. A split battery 501 is provided. Normally contact 496 rests against 497 and the transmitter contact 461 will send positive and negative impulses of uniform strength to the line. Magnets 492 in this form are slow to release and not affected by the interruptions of the line due to the shifting of contact 461 in ordinary signalling. To start the motors, it is necessary to open the line by depressing a key 495 a sufficiently long time to permit armatures 491 to drop back. To stop the motors, as in the circuit of Fig. 41 above described, a special signal is transmitted which throws contact 496 against 498 in the control station printer, and causes an impulse of increased potential to flow which picks up all the armatures 491 and stops the motors.

Having shown and described the preferred embodiment of my invention, it will be apparent that many equivalents will present themselves to those skilled in the art. The dependent inventions are not limited to use in the specific embodiments and the specific relations shown. Therefore what is desired to be secured by Letters Patent and is claimed as new is:

1. In a printing telegraph machine, a set of selectors; a printing mechanism controlled by said selectors and comprising type carrying and shift mechanisms; common operating means for said mechanisms; and a single cam supplying and controlling the entire actuating energy to said operating means.

2. In a printing telegraph machine, a set of selectors; type printing carriage shift and line feed mechanisms controlled by said selectors; common operating means for said mechanisms, and a single cam supplying the entire energy to said operating means.

3. The subcombination as set forth in claim 2 together with a spacing mechanism controlled by said selecting mechanism and actuated by means independently of said cam.

4. In a printing telegraph machine, a set of selectors; a plurality of actuating bars controlled by said selectors; a plurality of type bars controlled by certain of said actuating bars; shift and spacing mechanisms controlled by others of said actuating bars; an operating bail structure common to said actuating bars; and a single cam supplying the entire mechanical energy to said operating bail structure.

5. The combination as set forth in claim 4 together with a line feed mechanism controlled by one of said actuating bars and actuated by said operating bail structure.

6. In a printing telegraph machine, a selecting mechanism, type-carrying means, selectable actuating means controlling said type-carrying means, and operating means coacting with said actuating means to apply pressure to said type-carrying means until a selected character has been completely printed, whereby jar and noise of printing is substantially reduced.

7. In a printing telegraph machine, a plurality of type bars; selectable actuating bars controlling said type-bars and operating means coacting with said actuating bars and applying force to a selected type bar until the selected character impression has been completely made.

8. In a printing telegraph machine, a plurality of selectable actuating bars; a plurality of type bars linked to said actuating bars; and operating means for said actuating bars controlling the printing and return strokes of selected type-bars in a manner to substantially eliminate noise from printing impact and rebound in restoration of said bars.

9. The subcombination as set forth in claim 8 in which said operating means comprises a printing bail structure together with a cam shaped to control the entire printing and restoring strokes in a manner to soften the printing and restoring movements and to utilize substantially the full available time therefor.

10. The sub-combination as set forth in claim 8 in which said operating means comprises a printing bail structure actuated by energy stored in a spring during the printing stroke thereof and actuated by a cam during a restoring stroke thereof.

11. In a page printing telegraph machine, a set of type, function mechanisms, individual controllers for the type and function mechanisms, a set of selectors responsive to received code combinations for selecting said controllers, a single cam and means actuated thereby for effecting the engagement and disengagement of the controllers and selectors and the operation of the type and function mechanisms corresponding to the selected controllers.

12. In a page printing telegraph machine, a set of type bars, function mechanisms, individual actuators for the type and function mechanisms, a set of selectors controlling said actuators, a single cam, and a common operating member reciprocated by said cam for effecting the engagement and disengagement of the actuators and selectors and the operation of the selected actuator.

13. In a printing telegraph machine, a set of type bars, individual selectable actuating bars for said type bars, a common reciprocating striker for operating the selected actuating bars, a spring for effecting the forward movements of said striker bar and a cam for retracting said striker bar and for storing power in said spring, said cam being shaped to control and soften the entire printing and return movements of the selected type bars.

14. In a printing telegraph machine, a selecting mechanism; a printing mechanism controlled by said selecting mechanism; a spacing mechanism for said printing mechanism; a continuously rotating driving motor for said spacing mechanism, and continuously meshed gear drive connections comprising a control clutch between said motor and said spacing mechanism.

15. In a printing telegraph machine, a movable carriage, a continuously rotating motor, drive connections between said motor and said carriage comprising a clutch, and selectively controlled means controlling said clutch to predetermine the extent of movement of said carriage.

16. The combination as set forth in claim 14 in which said clutch is a constantly engaged friction clutch.

17. In a printing telegraph machine, a movable carriage, means for advancing said carriage at a substantially uniform rate, and selectively controlled means for starting and arresting the movement of said carriage.

18. In a printing telegraph machine, a selecting mechanism, a printing mechanism controlled by said selecting mechanism, a movable carriage coacting with said printing mechanism, means for moving said carriage to effect spacing between printed characters, and means for arresting said carriage just before a printed impression of a selected character is made and for causing resumption of movement of said carriage immediately after said printed impression is made.

19. In a printing telegraph machine, a selecting mechanism, a plurality of actuating bars controlled by said selecting mechanism, a plurality of type bars controlled by said actuating bars, operating means for said actuating bars, a movable carriage, a platen mounted on said carriage, and a motor driven spacing mechanism constantly tending to advance said carriage and controlled in operation by said operating means.

20. The combination as set forth in claim 19 in which said spacing mechanism comprises means controlled by said type-bars to arrest the motion of said carriage immediately preceding a printing impact of a selected character.

21. The combination as set forth in claim 19 in which said spacing mechanism comprises means actuated by said type-bars at the end of a printing stroke thereof to arrest movement of said carriage just before a printing impact of the selected type-bar.

22. The combination as set forth in claim 19 in which said spacing mechanism is driven by a continuously operating motor through a constantly engaged friction clutch, together with a stop and start means therefor controlled by said type-bars.

23. A printing telegraph machine comprising a carriage movable to effect spacing between printed characters, a rotary shaft driving said carriage to effect spacing movement of said carriage, a clutch driving said shaft, and control means for said clutch limiting the spacing movement of said carriage to predetermined amounts.

24. A spacing mechanism for printing telegraph machines comprising constantly engaged friction clutch, a driving motor for said friction clutch, a spacing drive shaft driven by said clutch, an escapement wheel secured to said shaft, and a selectively controlled pawl controlling said escapement wheel.

25. In a page printing telegraph machine, a set of selectors responsive to received code combinations, printing mechanism controlled thereby, operating means for said printing mechanism, a cooperating carriage, motor driven mechanism, including a friction clutch, constantly tending to advance the carriage and an escapement actuated by said operating means and controlling said carriage advancing mechanism to limit the movement of the carraige to single character spaces.

26. A telegraph printing machine comprising a selecting mechanism, a plurality of actuating bars controlled by said selecting mechanism, a plurality of type-bars controlled by certain of said actuating bars, an operating bail movable to effect a printing stroke of said type bars, a movable carriage coacting with said type bars, a spacing mechanism for said carriage including a clutch, and a carriage return mechanism comprising means for releasing said clutch controlled by one of said actuating bars and actuated during a printing stroke of said operating bail to permit the return of said carriage.

27. The combination as set forth in claim 26 together with means for locking said clutch in releasing position until said carriage has been completely returned.

28. The combination as set forth in claim 26 together with a latch for said clutch set during the disengagement of said clutch and released by the restoration of said carriage to normal.

29. In a printing telegraph machine, a motor driven carriage advancing mechanism including a toothed clutch; means for disengaging said clutch; a latch to hold said clutch in disengaged position, a common actuating bar for said means and said latch, and means for selectively actuating said actuating bar to simultaneously disengage said clutch and set said latch to permit the return of said carriage.

30. The combination as set forth in claim 29 together with means for releasing said latch when the return of said carriage is completed.

31. In a printing telegraph machine, a selecting mechanism, a printing mechanism controlled by said selecting mechanism, a carriage coacting with said printing mechanism, a spacing mechanism for advancing said carriage one space at a time, and a tabulating mechanism controlled by said selecting mechanism for causing said carriage to advance continuously through a plurality of spaces at a time.

32. In a printing telegraph machine, a selecting mechanism, a printing mechanism controlled by said selecting mechanism, a carriage coacting with said printing mechanism, a spacing mechanism for advancing said carriage one space at a time, and a tabulating mechanism controlled by said selecting mechanism for causing said carriage to advance through a plurality of tabulating steps varying in length, the movement of said carriage being continuous through each of said steps.

33. In a printing telegraph machine, a carriage, means for advancing said carriage continuously to effect spacing movements thereof, a spacing mechanism to limit the movement of said carriage to a single character space at a time and selectively controlled means for rendering said spacing mechanism ineffective to limit the movement of said carriage to single spaces.

34. The subcombination as set forth in claim 33 in which said last mentioned means comprises means for limiting the continuous movement of said carriage to a plurality of character spaces.

35. The subcombination as set forth in claim 33 in which said last mentioned means comprises means for limiting the continuous movement of said carriage to a plurality of character spaces of differing lengths.

36. The combination as set forth in claim 33 in which said last mentioned means comprises a pivotally mounted stop plate, a manually adjustable stop member adapted to be positioned at any one of a plurality of points along said stop plate, and a projection on said carriage coacting with said positioned stop member to arrest the movement of said carriage at predetermined points.

37. In a printing telegraph machine, a selecting mechanism, a plurality of actuating bars controlled by said selecting mechanism, an operating bail structure for said actuating bars, a spring connected to said bail structure and supply the energy thereto to effect printing stroke thereof, a cam actuating said bail structure to effect restoring movements thereof, and a line feed mechanism controlled by one of said actuating bars; said line feed mechanism being conditioned for operation by the spring actuated movement of said bail structure, and operated by the cam actuated movement of said bail structure.

38. In a printing telegraph machine, a selecting mechanism, a printing mechanism controlled by said selecting mechanism comprising a carriage return mechanism, a line feed mechanism, and operating means movable in one movement to effect operation of said carriage return mechanism, and in a retracing movement to effect operation of said line feed mechanism.

39. In a page printing telegraph machine, a set of type, function mechanisms, a set of selectors responsive to received code combinations for controlling the type and function mechanisms, a common reciprocating operating member movable in one direction to effect the printing operation and in the opposite to effect the operating of certain of said function mechanisms, a spring for effecting the forward printing movement of said operating member and a cam for positively effecting its movement in the opposite direction.

40. The subcombination set forth in claim 33 in which said last mentioned means comprises means for limiting the continuous movement of said carriage to a plurality of character spaces of differing lengths, and line feed and carriage return mechanisms controlled by one of said actuating bars.

41. The combination as set forth in claim 38 in which said carriage return mechanism is actuated and said line feed mechanism is conditioned for actuation on a printing stroke of said actuating bail structure, and said line feed mechanism is actuated on a restoring movement of said bail structure.

42. In a printing telegraph machine, selecting means responsive to received code combinations of electrical conditions; a plurality of selectable selector bars each embodying a plurality of notches and movable from normal position to actuated position in various combinations to effect selective alignment of said notches; a plurality of selector actuating bars selectively controlled by the selectively aligned slots; a set of slots in said bars positioned to be aligned when said selector bars are all in normal position, and a signal mechanism comprising an actuating bar controlled by said last mentioned set of slots to operate said signal mechanism when said selector bars remain in normal position during the operation of the machine.

43. The sub-combination as set forth in claim 42 together with means coacting with said last mentioned actuating bar to lock said selecting bars when the same are moved to actuated position.

44. In a printing telegraph machine, a selecting mechanism, a plurality of actuating bars controlled by said selecting mechanism, a plurality of type bars controlled by certain of said actuating bars, a shift mechanism controlled by one of said actuating bars, a spacing mechanism controlled by said type-bars, a set of electrical contacts controlled by one of said type-bar controlling actuating bars when said shift mechanism is operated, and means for preventing operation of said spacing mechanism when said contacts are actuated.

45. The combination as set forth in claim 44 in which said last mentioned means comprises a stop member for preventing a complete printing stroke of the type bar controlled by said contact controlling actuating bar.

46. In a page printing telegraph machine, a set of selectors responsive to received code combinations, printing mechanism controlled thereby, operating means for said printing mechanism, a cooperating carriage, a carriage return spring, motor driven mechanism, including a friction clutch, constantly tending to advance the carriage against the tension of said return spring, an escapement actuated by said operating means and controlling said carriage advancing mechanism, and means controlled by said selectors for disabling said carriage advancing mechanism to permit the return of the carriage by said spring.

47. In a page printing telegraph machine, a set of selectors responsive to received code combinations, printing mechanism controlled thereby, operating means for said printing mechanism, a cooperating carriage, a carriage return spring, motor driven mechanism, including a friction clutch, constantly tending to advance the carriage against the tension of said return spring, an escapement actuated by said operating means and controlling said carriage advancing mechanism to limit the movement of the carriage to single character spaces, means controlled by said selectors for disabling said escapement to permit the advance of the carriage through a plurality of character spaces and means controlled by said selectors for disabling said carriage advancing mechanism to permit the return movement of the carriage by said spring.

48. In a page printing telegraph machine, a set of type bars, function mechanisms, selectable actuators for said type bars and function mechanisms, a common reciprocating operating member, a spring for effecting the forward movement of said operating member and a cam for positively effecting its reverse movement, said member being arranged to effect the operation of the type bar actuators upon its forward spring actuated movement and to effect the operation of certain of said function actuators upon its reverse cam actuated movement.

In testimony whereof he affixes his signature.

EDWARD E. KLEINSCHMIDT.